(12) United States Patent
Sasaki

(10) Patent No.: US 10,511,063 B2
(45) Date of Patent: Dec. 17, 2019

(54) NEGATIVE ELECTRODE PLATE, ENERGY STORAGE DEVICE, METHOD FOR MANUFACTURING NEGATIVE ELECTRODE PLATE, AND METHOD FOR MANUFACTURING ENERGY STORAGE DEVICE

(71) Applicant: GS Yuasa International Ltd., Kyoto-shi (JP)

(72) Inventor: Takeshi Sasaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 97 days.

(21) Appl. No.: 15/408,474

(22) Filed: Jan. 18, 2017

(65) Prior Publication Data

US 2017/0207494 A1    Jul. 20, 2017

(30) Foreign Application Priority Data

Jan. 19, 2016  (JP) .................................. 2016-008303
Dec. 12, 2016  (JP) .................................. 2016-240452

(51) Int. Cl.
*H01M 10/42* (2006.01)
*H01M 10/0587* (2010.01)
(Continued)

(52) U.S. Cl.
CPC ........ *H01M 10/4235* (2013.01); *H01G 11/22* (2013.01); *H01M 10/0431* (2013.01);
(Continued)

(58) Field of Classification Search
CPC .......... H01M 10/0481; H01M 10/486; H01M 10/613; H01M 10/6562; H01M 2/1016; H01M 2/1653
See application file for complete search history.

(56) References Cited

U.S. PATENT DOCUMENTS 6,387,564 B1    5/2002   Yamashita et al.
2002/0006543 A1*  1/2002   Segawa ................. H01M 2/345
                                                429/94
(Continued)

FOREIGN PATENT DOCUMENTS

JP    H 09-134719 A    5/1997
JP    WO 98/38688 A1   9/1998
(Continued)

*Primary Examiner* — Adam A Arciero
(74) *Attorney, Agent, or Firm* — McGinn IP Law Group, PLLC

(57) ABSTRACT

Provided is a negative electrode plate in an electrode assembly of an energy storage device. The negative electrode plate includes: a negative base material layer; and negative active material layers formed on the negative base material layer in a state where the negative active material layers are exposed partially or wholly, wherein a peripheral edge portion of the negative electrode plate includes: a layer-non-formed portion that is disposed on a first side of the negative electrode plate, which is connected to a negative electrode current collector of the energy storage device and on which the negative active material layers are not formed; and a layer-non-exposed portion that is disposed on a second side of the negative electrode plate, which differs from the first side and on which the negative active material layers are not exposed.

20 Claims, 12 Drawing Sheets

(51) Int. Cl.
  *H01M 10/0525* (2010.01)
  *H01G 11/22* (2013.01)
  *H01M 10/04* (2006.01)
  *H01M 10/052* (2010.01)

(52) U.S. Cl.
  CPC ... *H01M 10/0525* (2013.01); *H01M 10/0587* (2013.01); *H01M 10/052* (2013.01); *H01M 2220/20* (2013.01); *Y02E 60/122* (2013.01); *Y02P 70/54* (2015.11)

(56) References Cited

U.S. PATENT DOCUMENTS

| | | | | |
|---|---|---|---|---|
| 2006/0172185 A1* | 8/2006 | Mimura | ............... | H01M 2/1673 429/101 |
| 2007/0224496 A1* | 9/2007 | Woo | .................... | H01M 2/1653 429/144 |
| 2009/0169986 A1 | 7/2009 | Fukunaga et al. | | |
| 2010/0216000 A1 | 8/2010 | Fujita et al. | | |
| 2013/0323568 A1 | 12/2013 | Tanaka | | |
| 2014/0322600 A1* | 10/2014 | Morita | .................... | H01M 4/13 429/212 |

FOREIGN PATENT DOCUMENTS

| | | |
|---|---|---|
| JP | 2001-176549 A | 6/2001 |
| JP | 2002-025604 A | 1/2002 |
| JP | 2006-236994 A | 9/2006 |
| JP | 2007-257848 A | 10/2007 |
| JP | 2008-103310 A | 5/2008 |
| JP | 2009-163942 A | 7/2009 |
| JP | 2012-038425 A | 2/2012 |
| JP | WO 2012/114497 A1 | 8/2012 |
| JP | 5692528 B2 | 4/2015 |
| JP | 2015-146237 A | 8/2015 |

* cited by examiner

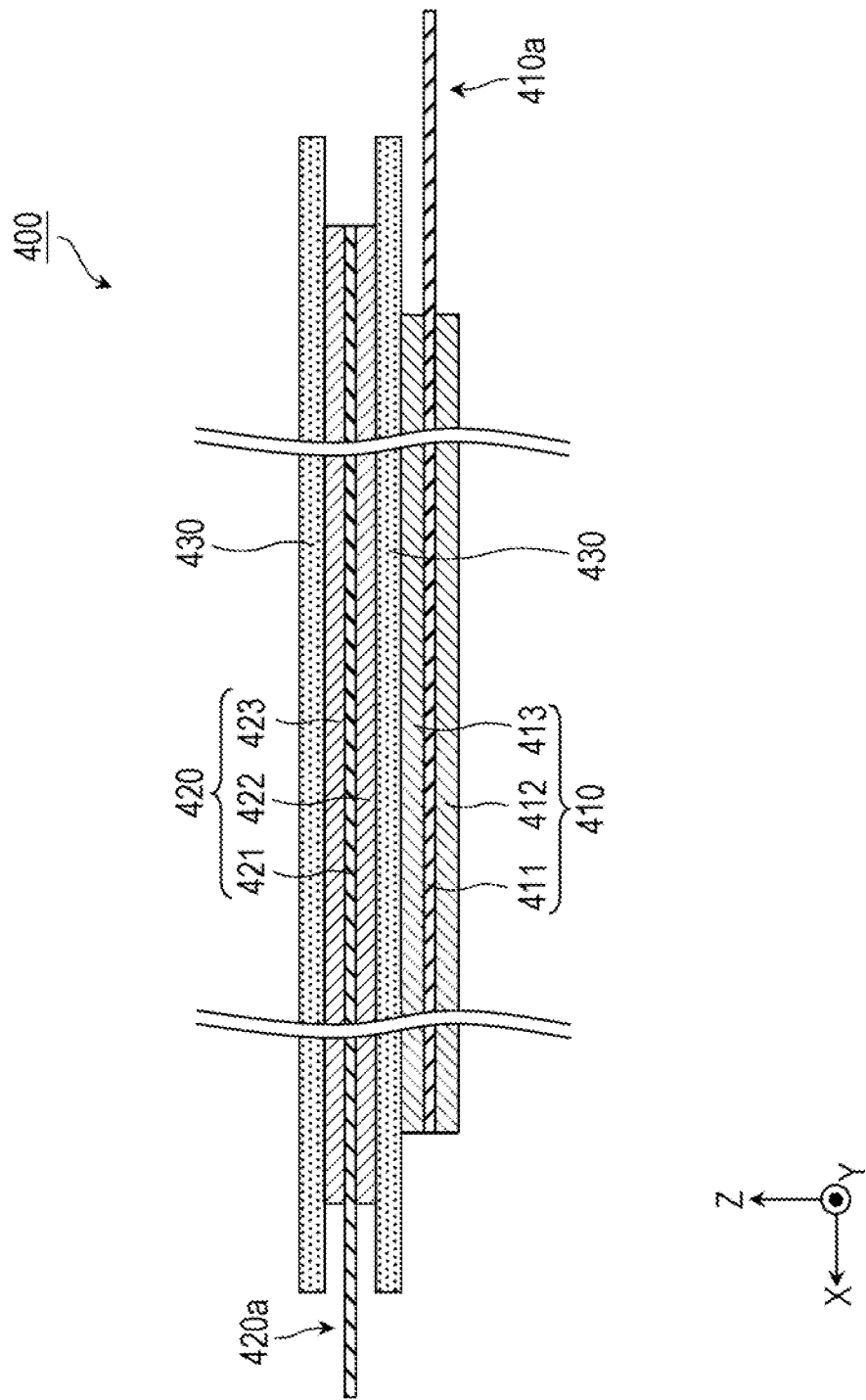

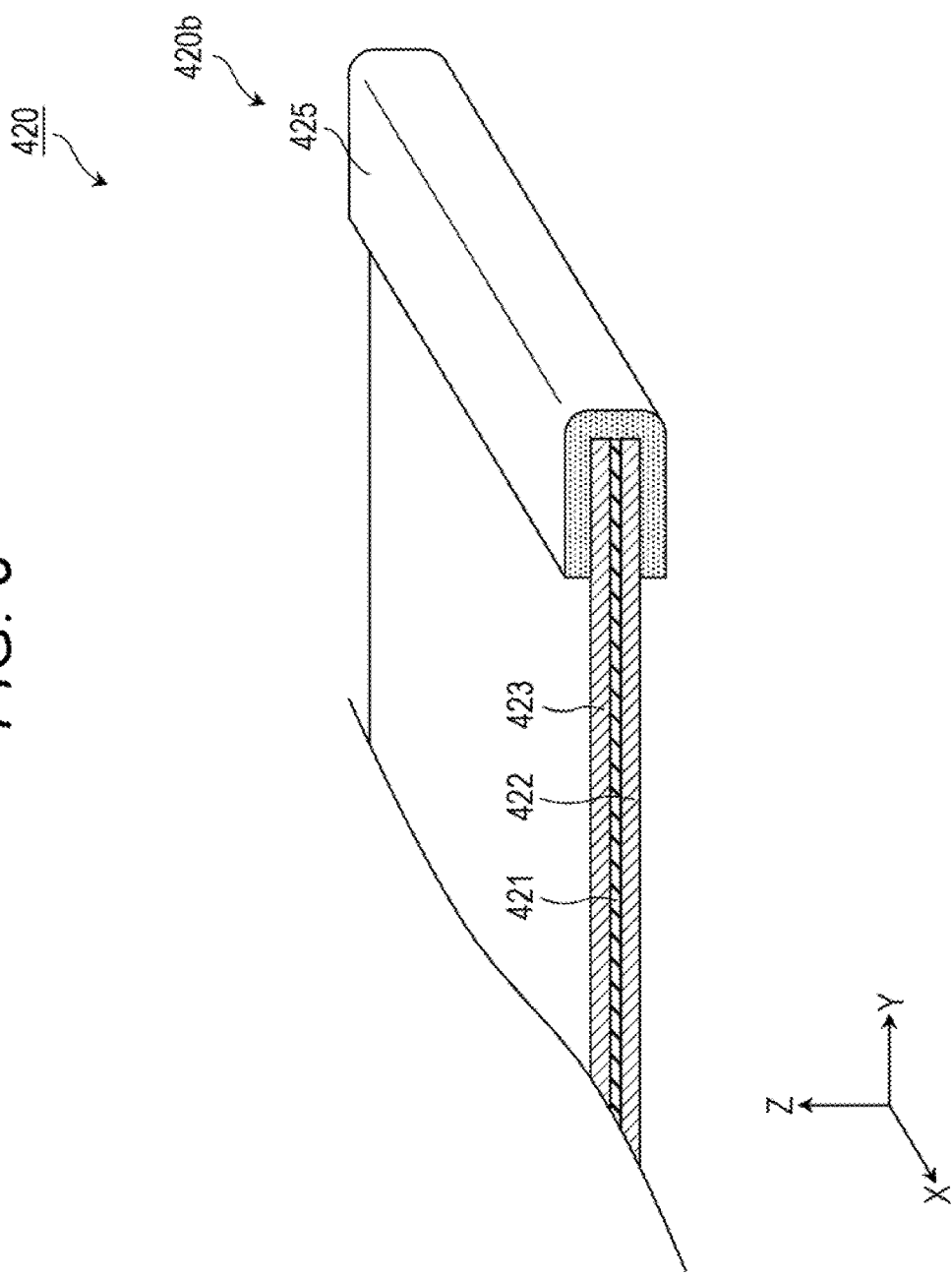

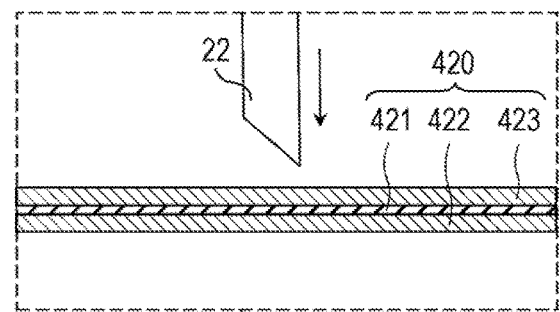
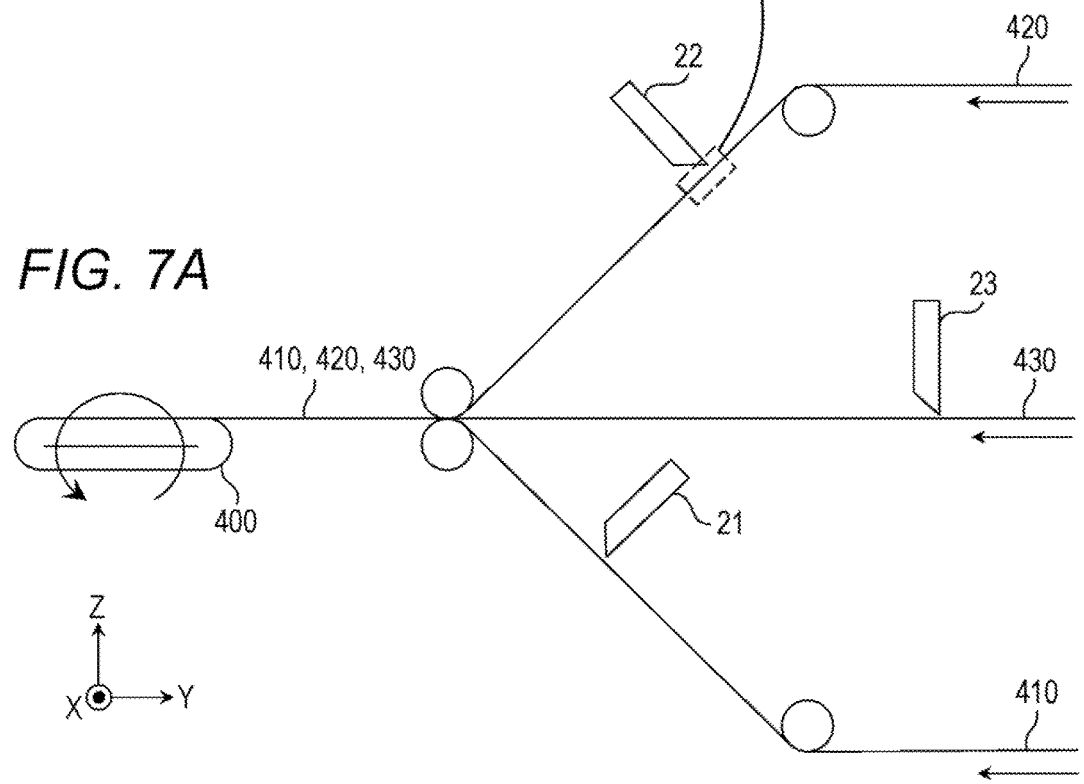

NEGATIVE ELECTRODE PLATE, ENERGY STORAGE DEVICE, METHOD FOR MANUFACTURING NEGATIVE ELECTRODE PLATE, AND METHOD FOR MANUFACTURING ENERGY STORAGE DEVICE

CROSS-REFERENCE TO RELATED APPLICATIONS

This application claims the benefit of Japanese patent applications No. 2016-008303, filed on Jan. 19, 2016, and No. 2016-240452, filed on Dec. 12, 2016, which are incorporated by reference.

FIELD

The present invention relates to a negative electrode plate, an energy storage device having an electrode assembly which includes a positive electrode plate and a negative electrode plate, a method for manufacturing a negative electrode plate, and a method for manufacturing an energy storage device.

BACKGROUND

To tackle a global environmental problem, conversion from a gasoline vehicle to an electric vehicle has become important. In view of such a circumstance, the development of an electric vehicle which uses an energy storage device such as a lithium ion secondary battery as a power source has been in progress.

Conventionally, there has been popularly known an energy storage device having the configuration where, as an electrode of the energy storage device, an electrode which is manufactured by forming an active material layer on a continuous body of a base material layer and, thereafter, by cutting (slitting) the continuous body by a predetermined length is used (see JP 2009-163942 A, for example).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In case of the energy storage device which uses the electrode where the base material layer and the active material layer are cut together as described above, a portion of a cut end portion (slit end portion) of the electrode falls and is mixed into an electrode assembly as an impurity (such mixing of the impurity being referred to as "contamination" hereinafter) thus causing various defects. As such defects, lowering of performance such as lowering of a capacity or the increase of a resistance, internal short-circuiting and the like are named, for example.

It is an object of the present invention to provide a negative electrode plate, an energy storage device, a method for manufacturing a negative electrode plate, and a method for manufacturing an energy storage device which can reduce the occurrence of contamination.

According to an aspect of the present invention, there is provided a negative electrode plate in an electrode assembly of an energy storage device, the negative electrode plate including: a base material layer; and an active material layer formed on the base material layer in a state where the active material layer is exposed partially or wholly, wherein a peripheral edge portion of the negative electrode plate includes: a layer-non-formed portion that is disposed on a first side of the negative electrode plate, which is connected to a current collector of the energy storage device and on which the active material layer is not formed on the base material layer; and a layer-non-exposed portion that is disposed on a second side of the negative electrode plate, which differs from the first side and on which the active material layer is not exposed.

BRIEF DESCRIPTION OF DRAWINGS

The foregoing and other features of the present invention will become apparent from the following description and drawings of an illustrative embodiment of the invention in which:

FIG. 5 is a cross-sectional view showing the configuration of the electrode assembly.

FIG. 6 is a cross-sectional perspective view showing the configuration of a layer-non-exposed portion.

FIGS. 7A and 7B are views showing steps for manufacturing the electrode assembly and a partially enlarged view.

DESCRIPTION OF EMBODIMENTS

Figure 1:
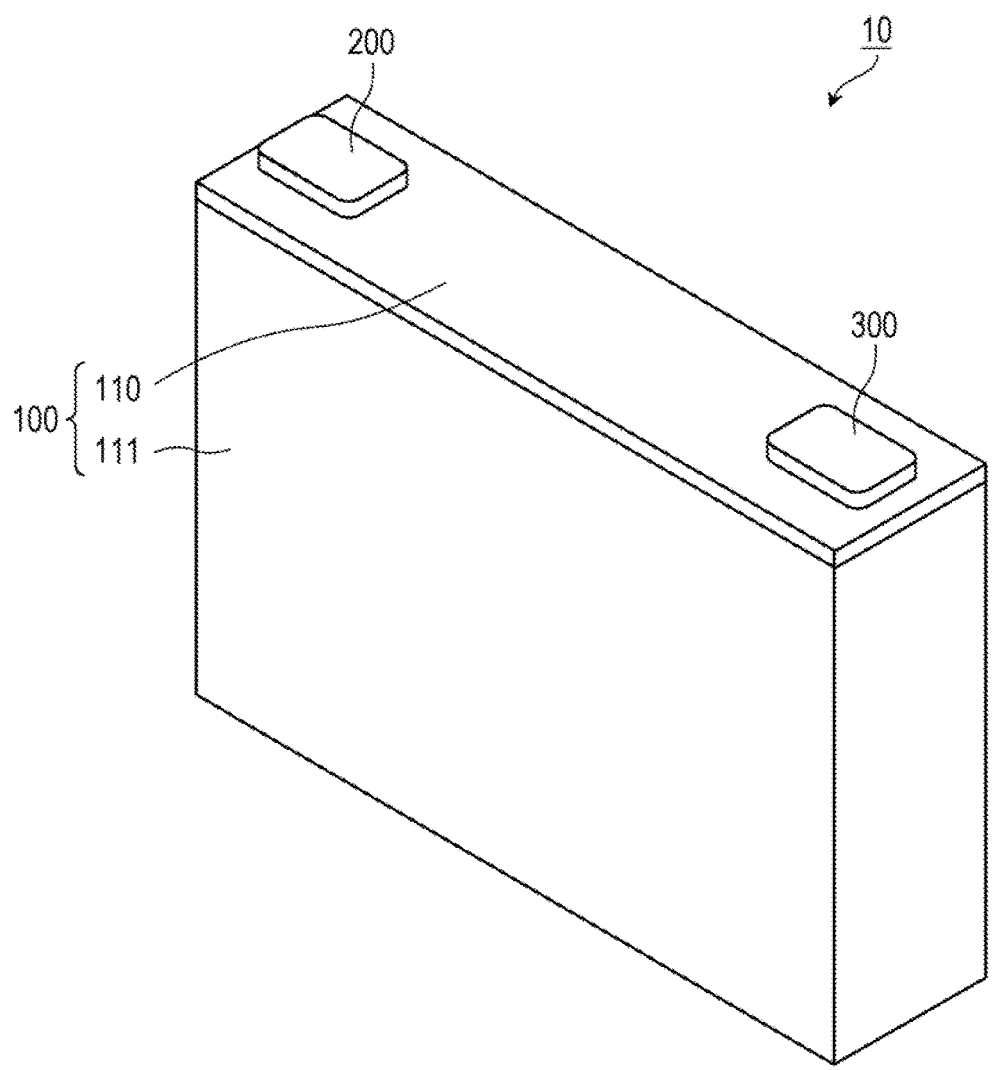
FIG. 1 is a perspective view schematically showing an external appearance of an energy storage device according to a first embodiment of the present invention.

According to an aspect of the present invention, there is provided a negative electrode plate in an electrode assembly of an energy storage device, the negative electrode plate including: a base material layer; and an active material layer formed on the base material layer in a state where the active material layer is exposed partially or wholly, wherein a peripheral edge portion of the negative electrode plate includes: a layer-non-formed portion that is disposed on a first side of the negative electrode plate, which is connected to a current collector of the energy storage device and on which the active material layer is not formed; and a layer-non-exposed portion that is disposed on a second side of the negative electrode plate, which differs from the first side and on which the active material layer is not exposed.

In the electrode assembly where the positive electrode plate and the negative electrode plate are stacked on each other, the electrode assembly is compressed by an inner wall of a container of the energy storage device and hence, portions of the positive electrode plate and the negative electrode plate which opposedly face each other are compressed. Accordingly, in the opposedly facing portions, the generation of chips (shavings) of the base material layer and floating off of the active material layer can be suppressed by compression and hence, it is possible to reduce the cause of contamination. In general, when a portion of a cut end portion of a negative electrode plate falls, a defect such as internal short-circuiting is liable to occur. Accordingly, to reduce the occurrence of contamination in an energy storage device, it is particularly effective to reduce the occurrence of contamination caused by a negative electrode plate.

In the negative electrode plate according to the aspect of the present invention, the negative electrode plate has the layer-non-exposed portion where the active material layer is not exposed on the peripheral edge portion thereof. Thus, falling of an active material on the peripheral edge portion of the negative electrode plate can be suppressed whereby the occurrence of contamination can be reduced.

It is another aspect of the present invention to provide an energy storage device which includes an electrode assembly having the above-mentioned negative electrode plate and a positive electrode plate.

In the energy storage device having such a configuration, the layer-non-exposed portion where the active material layer is not exposed is disposed on the peripheral edge portion of the negative electrode plate. Thus, falling of a portion of a cut end portion of the negative electrode plate can be suppressed whereby the occurrence of contamination can be reduced.

The layer-non-exposed portion may be formed of at least one of either a portion of the base material layer which is covered by a covering material mounted on the base material layer or a portion of the base material on which the active material layer is not formed.

When the base material layer is covered by a covering material which is not mounted on the base material layer, there is a possibility that an end portion of the base material layer falls together with the covering material. That is, there is a possibility that contamination occurs due to falling of the base material layer together with the covering material. Accordingly, by mounting the covering material on the base material layer, falling of the covering material can be suppressed and hence, falling of the base material layer can be suppressed with more certainty whereby the occurrence of contamination can be reduced with more certainty.

By disposing the portion where the active material layer is not formed on the peripheral edge portion of the negative electrode plate, the negative electrode plate can be manufactured by cutting such a portion where the active material layer is not formed. Accordingly, the occurrence of contamination can be reduced.

The layer-non-exposed portion may be disposed on a short side of the negative electrode plate.

The layer-non-exposed portion is disposed on the short side of the negative electrode plate as described above. Thus, the occurrence of contamination can be reduced even when negative electrode plates are manufactured by cutting a continuous body of the negative electrode plates (hereinafter, referred to as "negative electrode mother material") on which an active material layer is uniformly formed along a longitudinal direction.

The layer-non-exposed portion may be formed of a portion of the base material layer which is covered by a covering material mounted on the base material layer, and may be disposed on both short sides of the negative electrode plate.

There may be a case where so-called intermittent coating where an active material layer is intermittently formed on the negative electrode mother material in the longitudinal direction of the negative electrode mother material is difficult from a viewpoint of manufacture. As a result, it is difficult to form portions where an active material layer is not formed on short sides of a negative electrode plate. Accordingly, by configuring the layer-non-exposed portion disposed on both short sides of the negative electrode plate such that the base material layer is covered by the covering material, the cause of contamination can be reduced on both short sides of the negative electrode plate.

The layer-non-exposed portion may be disposed on a long side of the negative electrode plate.

When a generation amount of chips of the base material layer and a falling amount of the active material layer per unit length are equal between the short side of the negative electrode plate and the long side of the negative electrode plate, generated chips and falling of the chips on the long side are liable to become the cause of contamination. Accordingly, by disposing the layer-non-exposed portion on the long side of the negative electrode plate, the cause of contamination can be reduced at the portion where contamination is liable to occur.

The layer-non-exposed portion may be formed of a portion where the active material layer is not formed, the layer-non-formed portion may be disposed on one of both long sides of the negative electrode plate, and the layer-non-exposed portion may be disposed on the other of both long sides.

When the layer-non-exposed portion disposed on the long side of the negative electrode plate is formed of a portion where the active material layer is covered by the covering material, for example, thicknesses of both long sides of the negative electrode plate may differ from each other. Accordingly, in a so-called winding-type electrode assembly formed by winding a positive electrode plate and a negative electrode plate, there is a possibility that the negative electrode plate meanders at the time of winding the positive electrode plate and the negative electrode plate so that accuracy in winding is lowered thus deteriorating a yield. Further, although it is not limited to a winding-type electrode assembly, when thicknesses of both long sides of a negative electrode plate differ from each other, a size control of the electrode assembly becomes difficult and hence, the accommodation of the electrode assembly in the inside of a container of an energy storage device becomes difficult. In view of the above, by forming the layer-non-exposed portion disposed on the long side of the negative electrode plate by a portion where the active material layer is not disposed, a size control of the electrode assembly becomes easy, and the occurrence of contamination can be reduced while maintaining a yield.

A length of the short side of the negative electrode plate may be set larger than a length of the short side of the positive electrode plate.

In the electrode assembly where the positive electrode plate and the negative electrode plate are stacked on each other, the electrode assembly is compressed by an inner wall of a container of the energy storage device and hence, portions of the positive electrode plate and the negative electrode plate which opposedly face each other are compressed. Accordingly, in the opposedly facing portions, the generation of chips of the base material layer and floating off of the active material layer can be suppressed by compression. In such a configuration, a length of the short side of the negative electrode plate is larger than the length of the short side of the positive electrode plate and hence, both end portions of the negative electrode plate in a lateral direction do not opposedly face the positive electrode plate whereby both end portions are minimally compressed. Accordingly, the generating of chips of the base material layer and floating off of the active material layer are liable to occur at both end portions of the negative electrode plate in the lateral direction thus giving rise to a possibility that contamination occurs. Accordingly, by disposing the layer-non-exposed portion on the long side of the negative electrode plate, it is possible to reduce the cause of contamination at a portion where the cause of contamination is liable to occur.

The negative electrode plate may be larger than the positive electrode plate with respect to a circumferential length which is a combination of the lengths of both short sides and the lengths of both long sides.

When a generation amount of chips of the base material layer and a falling amount of the active material layer per unit length are equal between the short side and the long side of the positive electrode plate and the short side and the long side of the negative electrode plate, contamination is liable to occur due to the electrode where a circumferential length which is a combination of the lengths of both short sides and the lengths of both long sides is large. Accordingly, by disposing the layer non-exposed portion on the peripheral edge portion of the negative electrode plate having a larger circumferential length than the positive electrode plate, the cause of contamination can be reduced at the electrode where the cause of contamination is liable to occur.

The base material layer may contain metal which melts at an electric potential of the positive electrode plate.

In the case where the base material layer of the negative electrode plate contains metal which melts at an electric potential of the positive electrode plate, when chips of the base material layer of the negative electrode plate are generated, the chips are melted on the positive electrode plate, are ionized and, thereafter, are precipitated in a dendrite shape on the negative electrode plate so that there is a possibility that internal short-circuiting occurs. Accordingly, by disposing the layer-non-exposed portion on the peripheral edge portion of the negative electrode plate, it is possible to suppress the generation of chips of the base material layer of the negative electrode plate and hence, it is possible to suppress the generation of internal short-circuiting caused by the precipitation of melted chips in a dendrite shape on the negative electrode plate.

The present invention can be realized not only in the forms of a negative electrode plate and an energy storage device but also in the forms of a method for manufacturing a negative electrode plate and a method for manufacturing an energy storage device.

According to the aspects of the present invention, it is possible to provide a negative electrode plate which forms a part of an electrode assembly of an energy storage device and can reduce the occurrence of contamination and the like.

Hereinafter, a negative electrode plate, an energy storage device, a method for manufacturing a negative electrode plate, and a method for manufacturing an energy storage device according to embodiments of the present invention are described with reference to drawings. All embodiments described hereinafter describe preferred specific examples of the present invention. In the embodiments described hereinafter, numerical values, shapes, materials, constitutional elements, the arrangement positions and connection states of the constitutional elements, manufacturing steps, the order of the manufacturing steps and the like are merely examples, and these are not intended to be used for limiting the present invention. Further, out of the constitutional elements in the embodiments described hereinafter, the constitutional elements which are not described in independent claims describing an uppermost concept of the present invention are described as arbitrary constitutional elements which form more preferable mode. In the respective drawings, the respective constitutional elements are not always described strictly accurately in size or the like.

First Embodiment

Firstly, the configuration of an energy storage device 10 is described.

Figure 2:
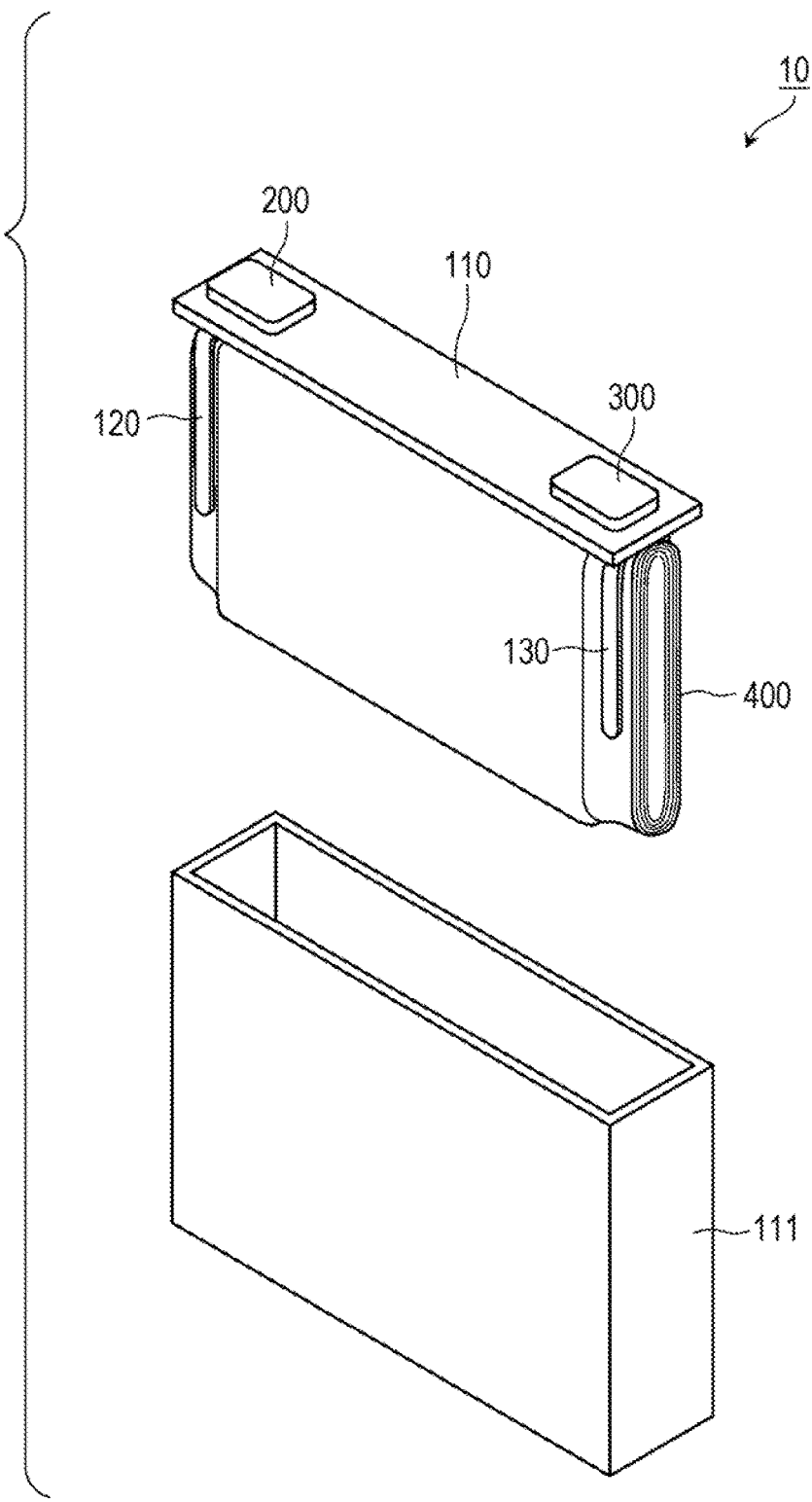
FIG. 2 is a perspective view showing constitutional elements disposed in a container of the energy storage device.

FIG. 1 is a perspective view schematically showing an external appearance of an energy storage device 10 according to a first embodiment of the present invention. FIG. 2 is a perspective view showing constitutional elements disposed in a container of the energy storage device 10. To be more specific, FIG. 2 is a perspective view showing the configuration of the energy storage device 10 in a state where a body 111 of the container 100 is separated from the energy storage device 10.

The energy storage device 10 is a secondary battery which can be charged with or discharge electricity. To be more specific, the energy storage device 10 is a nonaqueous electrolyte secondary battery such as a lithium ion secondary battery. For example, the energy storage device 10 is used for an electric vehicle (EV), a hybrid electric vehicle (HEV), or a plug-in hybrid electric vehicle (PHEV). The energy storage device 10 is not limited to a nonaqueous electrolyte secondary battery, and may be a secondary battery other than a nonaqueous electrolyte secondary battery, or may be a capacitor.

As shown in FIG. 1, the energy storage device 10 includes: the container 100; a positive electrode terminal 200; and a negative electrode terminal 300. As shown in FIG. 2, a positive electrode current collector 120, a negative electrode current collector 130, and an electrode assembly 400 are housed in the container 100.

Spacers disposed on sides of the positive electrode current collector 120 and the negative electrode current collector 130, a safety valve which releases a pressure in the container 100 when the pressure in the container 100 is increased, an insulating film which surrounds the electrode assembly 400 or the like may also be disposed in the container 100. A liquid such as an electrolyte solution (nonaqueous electrolyte) is filled in the container 100 of the energy storage device 10. However, the illustration of the liquid is omitted in the drawing. A kind of electrolyte solution filled in the container 100 is not particularly limited provided that the performance of the energy storage device 10 is not impaired, and various electrolyte solutions can be selectively used.

The container 100 is formed of: a body 111 having a bottomed rectangular cylindrical shape; and a lid body 110 formed of a plate-like member which closes an opening of the body 111. The container 100 is configured such that the inside of the container 100 is hermetically sealed by joining the lid body 110 and the body 111 to each other by welding or the like after the electrode assembly 400 and the like are housed in the inside of the container 100. Although a material for forming the lid body 110 and a material for forming the body 111 are not particularly limited, it is preferable that the lid body 110 and the body 111 be made of weldable metal such as stainless steel, aluminum or an aluminum alloy, for example.

The electrode assembly 400 is a member which includes a positive electrode plate (hereinafter, simply also referred to as "positive electrode"), a negative electrode plate (hereinafter, simply also referred to as "negative electrode") and separators, and can store electricity. The positive electrode is formed such that a positive active material layer is formed on a positive electrode base material layer having an elongated strip shape and made of aluminum, an aluminum alloy or the like. The negative electrode is formed such that a negative active material layer is formed on a negative electrode base material layer having an elongated strip shape and made of copper, a copper alloy or the like. The separator is formed using a microporous sheet made of a resin. The detailed configuration of the electrode assembly 400 is described later.

FIG. 2 shows the electrode assembly 400 having an elongated circular shape. However, the electrode assembly 400 may have a circular shape or an elliptical shape. The electrode assembly 400 is not limited to an electrode assembly of a winding type, and may be of a stack type where plates having a flat plate shape are stacked in multiple layers, or may be of a type where a plate having an elongated strip shape is stacked in a bellows shape by folding the plate such that mount folding and valley folding are repeated.

The positive electrode terminal 200 is an electrode terminal which is electrically connected to the positive electrode of the electrode assembly 400. The negative electrode terminal 300 is an electrode terminal which is electrically connected to the negative electrode of the electrode assembly 400. That is, the positive electrode terminal 200 and the negative electrode terminal 300 are metal-made electrode terminals through which electricity stored in the electrode assembly 400 is discharged to a space outside the energy storage device 10 and through which electricity is introduced into a space inside the energy storage device 10 for storing the electricity in the electrode assembly 400. The positive electrode terminal 200 and the negative electrode terminal 300 are mounted on the lid body 110 disposed above the electrode assembly 400.

The positive electrode current collector 120 is a member having conductivity and rigidity which is disposed between the positive electrode of the electrode assembly 400 and wall surfaces of the body 111 of the container 100, and is electrically connected to the positive electrode terminal 200 and the positive electrode of the electrode assembly 400. In the same manner as the positive electrode base material layer of the electrode assembly 400, the positive electrode current collector 120 is made of aluminum, an aluminum alloy or the like.

The negative electrode current collector 130 is a member having conductivity and rigidity which is disposed between the negative electrode of the electrode assembly 400 and the wall surfaces of the body 111 of the container 100, and is electrically connected to the negative electrode terminal 300 and the negative electrode of the electrode assembly 400. In the same manner as the negative electrode base material layer of the electrode assembly 400, the negative electrode current collector 130 is made of copper, a copper alloy or the like.

To be more specific, the positive electrode current collector 120 and the negative electrode current collector 130 are plate-like members made of metal each of which is disposed in a bent state along the wall surfaces of the body 111 and the lid body 110 over an area ranging from the wall surfaces of the body 111 to the lid body 110. The positive electrode current collector 120 and the negative electrode current collector 130 are fixedly connected to the lid body 110, and are fixedly connected to the positive electrode and the negative electrode of the electrode assembly 400 respectively by welding or the like. With such a configuration, the electrode assembly 400 is held in the container 100 in a state where the electrode assembly 400 is suspended from the lid body 110 by the positive electrode current collector 120 and the negative electrode current collector 130.

Next, the configuration of the electrode assembly 400 is described in detail with reference to FIG. 3 to FIG. 5.

Figure 3:
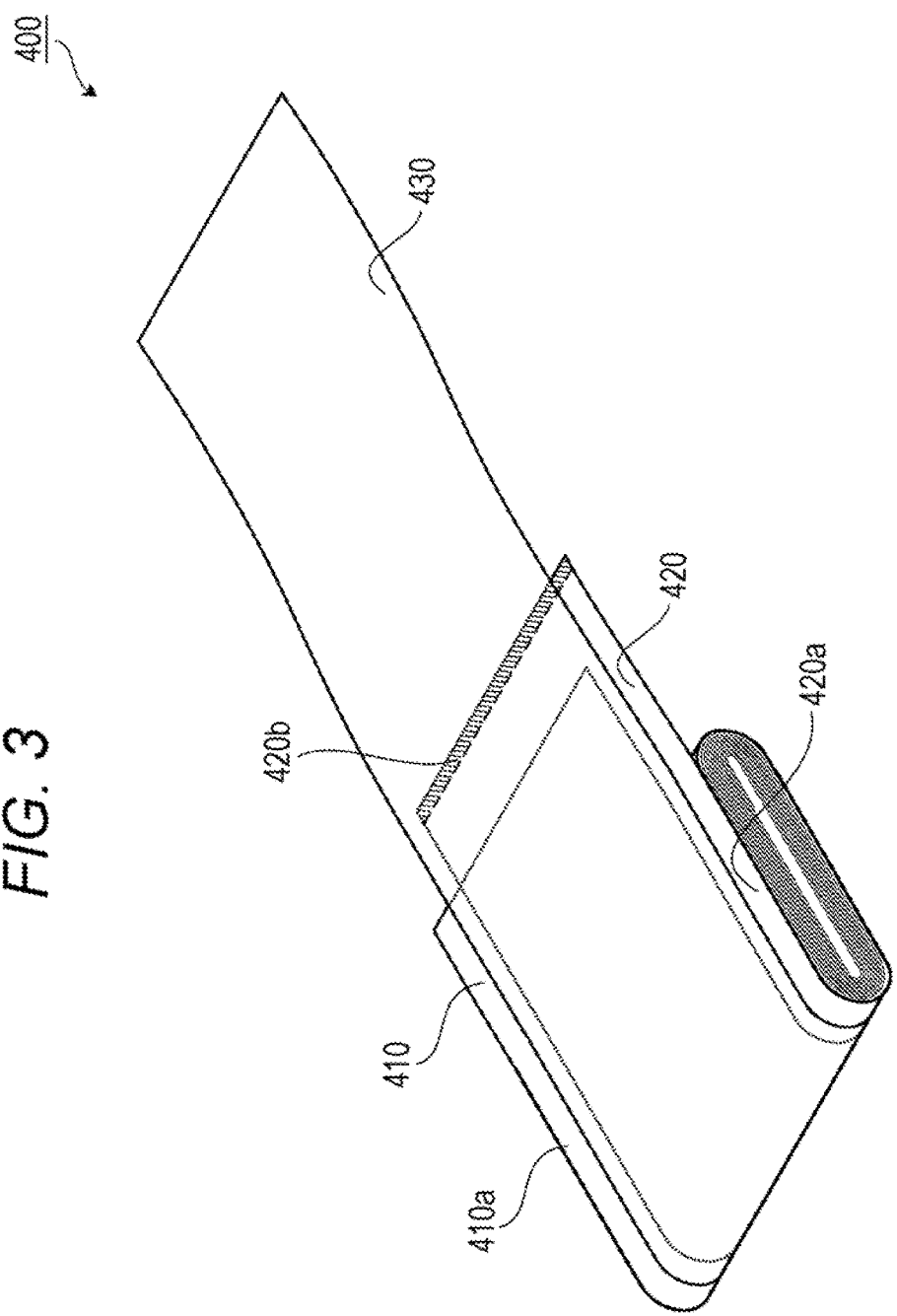
FIG. 3 is a partially developed perspective view showing an electrode assembly in a wound state.

FIG. 3 is a partially developed perspective view showing the electrode assembly 400 in a wound state.

Figure 4:
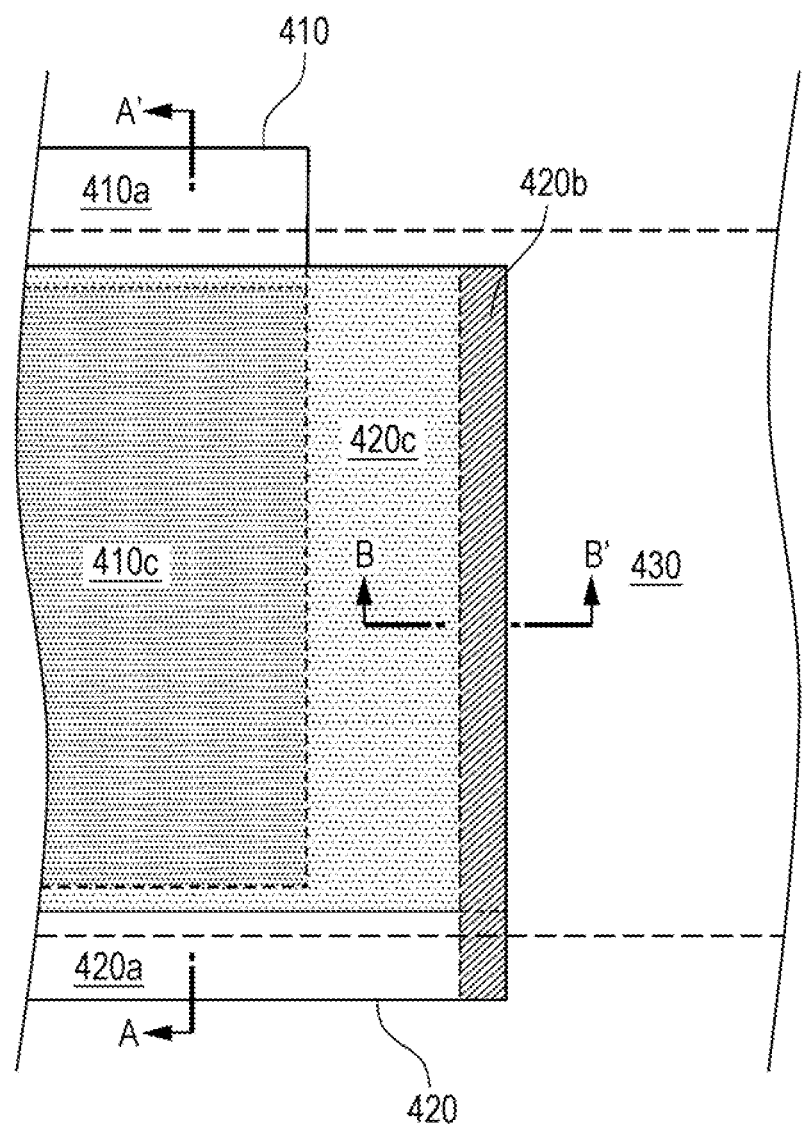
FIG. 4 is a top plan view showing the configuration of the electrode assembly.

FIG. 4 is a top plan view showing the configuration of the electrode assembly 400. To be more specific, FIG. 4 is a view as viewed from a plus side in the Z axis direction showing an end portion of the negative electrode 420 in the winding direction in an enlarged manner. For the sake of convenience of the description, in FIG. 4, the separator 430 is illustrated in a see-through manner, and a layer formed portion 410c which is a region of the positive electrode 410 where a positive active material layer is formed, a layer-non-exposed portion 420b (described later) of the negative electrode 420, and a layer formed portion 420c which is a region of the negative electrode 420 where a negative active material layer is formed are indicated by hatching.

FIG. 5 is a cross-sectional view showing the configuration of the electrode assembly 400. To be more specific, FIG. 5 is a cross-sectional view of the electrode assembly 400 taken along a line A-A in FIG. 4. The electrode assembly 400 is formed by winding the positive electrode 410, the negative electrode 420 and the separators 430 such that plural sets of constitutional elements each of which is constituted of the positive electrode 410, the negative electrode 420 and the separators 430 are repeatedly stacked. FIG. 5 shows only one set of constitutional elements and the illustration of other sets of constitutional elements is omitted in the drawing.

As shown in FIG. 3 to FIG. 5, the electrode assembly 400 is formed by winding the positive electrode 410, the negative electrode 420 and two separators 430 in a state where these members are disposed in the order of the separator 430, the negative electrode 420, the separator 430 and the positive electrode 410.

The positive electrode 410 is an electrode plate where a positive active material layer is formed on a surface of a conductive positive electrode current collecting foil made of aluminum or an aluminum alloy and having an elongated strip shape. To be more specific, as shown in FIG. 5, the positive electrode 410 includes a positive electrode base material layer 411 and positive active material layers 412 and 413.

The positive electrode base material layer 411 is a conductive current collecting foil made of aluminum, an aluminum alloy or the like, for example, and having an elongated strip shape.

The positive active material layer 412, 413 is an active material layer formed on the positive electrode base material layer 411 in a state where the positive active material layer is exposed partially or wholly (the active material layer is wholly exposed in this embodiment).

To be more specific, the positive active material layer 412 is an active material layer which is disposed on an inner peripheral side of the positive electrode base material layer 411 (a minus side in the Z axis direction in FIG. 5). The positive active material layer 413 is an active material layer which is disposed on an outer peripheral side of the positive electrode base material layer 411 (a plus side in the Z axis direction in FIG. 5).

In this embodiment, the positive active material layer 412, 413 contains a positive active material, a binder and a conductive assistant. As a positive active material used for forming the positive active material layer 412, 413, a known material can be used as desired provided that the material is a positive active material which can occlude and discharge lithium ions. For example, a composite oxide expressed by $Li_xMO_y$ (M indicating at least one kind of transition metal) ($Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$, $Li_xNi_yMn_{(2-y)}O_4$ or the like), or a polyanion compound expressed by $Li_wMe_x(XO_y)_z$ (Me indicating at least one kind of transition metal, X being P, Si, B or V, for example) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ or the like) can be selectively used as the positive active material. An element or a polyanion in these compounds may be partially replaced with other element or other anion species. A metal oxide such as $ZrO_2$, $MgO$ or $Al_2O_3$, or carbon may be applied to a surface of the positive active material layer 412, 413 by coating. A conductive polymer compound such as disulfide, polypyrrole, polyaniline, poly-para-styrene, polyacetylene or a polyacene-based material, a carbonaceous material having the pseudo-graphite structure or the like can be also named as a positive active material. However, the positive active material is not limited to these compounds or materials. These compounds may be used singly or may be used in a state where two or more kinds of compounds are mixed.

The negative electrode 420 is an electrode plate where a negative active material layer is formed on a surface of a conductive negative electrode current collecting foil made of copper or a copper alloy and having an elongated strip shape. To be more specific, as shown in FIG. 5, the negative electrode 420 includes a negative electrode base material layer 421 and negative active material layers 422 and 423.

The negative electrode base material layer 421 is a conductive current collecting foil made of copper, a copper alloy or the like, for example, and having an elongated strip shape.

The negative active material layer 422, 423 is an active material layer formed on the negative electrode base material layer 421 in a state where the negative active material layer is exposed partially or wholly. That is, the negative active material layer 422, 423 is formed on the negative electrode base material layer 421 in a state where at least a portion of the negative active material layer is exposed. To be more specific, the negative active material layer 422 is an active material layer which is disposed on an inner peripheral side of the negative electrode base material layer 421 (a minus side in the Z axis direction in FIG. 5). The negative active material layer 423 is an active material layer which is disposed on an outer peripheral side of the negative electrode base material layer 421 (a plus side in the Z axis direction in FIG. 5).

In this embodiment, the negative active material layer 422, 423 contains a negative active material, a binder and a conductive assistant. As a negative active material used for forming the negative active material layer 422, 423, a known material can be used as desired provided that the material is a negative active material which can occlude and discharge lithium ions. For example, in addition to lithium metal and a lithium alloy (an alloy containing lithium metal such as lithium-aluminum, lithium-lead, lithium-tin, lithium-aluminum-tin, lithium-gallium, and a Wood's alloy), an alloy which can occlude and discharge lithium ions, a carbon material (for example, graphite, hardly graphitizable carbon (hard carbon, coke or the like), easily graphitizable carbon, low temperature baked carbon, amorphous carbon or the like), a metal oxide, a lithium metal oxide ($Li_4Ti_5O_{12}$ or the like), a polyphosphoric acid compound or the like can be named.

As a binder which is used for forming the negative active material layer 422, 423, a binder equal to the binder which is used in the positive active material layer 412, 413 can be used.

The separator 430 is formed of a microporous sheet made of a resin, and is impregnated with an electrolyte solution which contains an organic solvent and electrolyte salt. As the separator 430, a fabric or a film which is insoluble in the organic solvent, that is, a woven fabric, a non-woven fabric or a synthetic resin microporous film made of a polyolefin resin such as polyethylene is used. It may be possible to use a film formed by laminating a plurality of microporous films which differ from each other in material, weight average molecular weight or porosity, a film formed of these microporous films which contains a proper amount of additive such as a plasticizer, an antioxidant or a flame retarder, or a film to which an inorganic oxide such as silica is applied to one surface or both surfaces of the film by coating. A synthetic resin microporous film is particularly preferably used. Above all, a microporous film made of polyethylene or polypropylene, a microporous film made of polyethylene or polypropylene which is compounded with aramid or polyimide, or a polyolefin microporous film such as a microporous film which is formed by combining these films is preferably used in view of thickness, film strength, film resistance or the like.

As described above, the electrode assembly 400 is formed by winding and stacking the positive electrode 410 and the negative electrode 420.

In this embodiment, the positive electrode 410 is formed such that a layer-non-formed portion 410a which is an edge portion of the positive electrode 410 on a minus side in the X axis direction which is connected to the positive electrode current collector 120 (an edge portion of the positive electrode base material layer 411 where the positive active material layers 412 and 413 are not formed) projects from the separators 430. The positive electrode 410 is electrically and mechanically connected to the positive electrode current collector 120 at the layer-non-formed portion 410a which projects from the separators 430. That is, a peripheral edge portion of the positive electrode 410 has the layer-non-formed portion 410a where the positive active material layers 412 and 413 are not formed. The layer-non-formed portion 410a is disposed on a side where the positive electrode 410 is connected to the positive electrode current collector 120.

To be more specific, the negative electrode 420 is formed such that a layer-non-formed portion 420a which is an edge portion of the negative electrode 420 on a plus side in the X axis direction which is connected to the negative electrode current collector 130 (an edge portion of the negative electrode base material layer 421 where the negative active material layers 422 and 423 are not formed) projects from the separators 430. The negative electrode 420 is electrically and mechanically connected to the negative electrode current collector 130 at the layer-non-formed portion 420a which projects from the separators 430. That is, a peripheral edge portion of the negative electrode 420 has the layer-non-formed portion 420a where the negative active material layers 422 and 423 are not formed. The layer-non-formed portion 420a is disposed on a side where the negative electrode 420 is connected to the negative electrode current collector 130.

An end portion of the negative electrode 420 in the winding direction which is an end portion of the negative electrode 420 on a plus side in the Y axis direction is disposed in a projecting manner from the positive electrode 410. The negative electrode 420 has a layer-non-exposed portion 420b where the negative active material layers 422 and 423 are not exposed at the portion of the negative electrode 420 which projects from the positive electrode 410.

In this embodiment, as viewed in the thickness direction of the negative electrode 420 (as viewed in the Z axis direction), the negative active material layer 422, 423 is set larger than the positive active material layer 412, 413. That is, as viewed in the thickness direction, the positive active material layer 412, 413 is disposed so as to be contained in the negative active material layer 422, 423.

Accordingly, a length of a short side of the negative electrode 420 (a length in the X axis direction) is larger than a length of a short side of the positive electrode 410, and a length of a long side of the negative electrode 420 (a length in the Y axis direction in FIG. 4) is also larger than a length of a long side of the positive electrode 410. That is, a circumferential length of the negative electrode 420 which is a combination of the lengths of both short sides (sides on both ends in the winding direction) and lengths of both long sides (sides on both edge in the winding axis direction) of the negative electrode 420 is set larger than a circumferential length of the positive electrode 410. The short side and the long side of the negative electrode 420 mean the short side and the long side of the negative electrode 420 in a state before the negative electrode 420 is wound. That is, the short side of the negative electrode 420 means a side on an innermost peripheral end or a side on an outermost peripheral end of the negative electrode 420 in a state after the negative electrode 420 is wound. The long side of the negative electrode 420 means a side on one edge portion or a side on the other edge portion of the negative electrode 420 in the winding axis direction in a state after the negative electrode 420 is wound.

As described above, the peripheral edge portion of the negative electrode 420 has the layer-non-formed portion 420a and the layer-non-exposed portion 420b. The layer-non-formed portion 420a is disposed on a side (first side) of the negative electrode 420 where the negative electrode 420 is connected to the negative electrode current collector 130, and the negative active material layers 422 and 423 are not formed in the layer-non-formed portion 420a. The layer-non-exposed portion 420b is disposed on a side (second side) of the negative electrode 420 different from the side of the negative electrode 420 where the negative electrode 420 is connected to the negative electrode current collector 130, and the negative active material layers 422 and 423 are not exposed to the outside in the layer-non-exposed portion 420b. To be more specific, the layer-non-formed portion 420a is disposed on the long side of the negative electrode 420 having an elongated strip shape, and the layer-non-exposed portion 420b is disposed on the short side of the negative electrode 420.

In this embodiment, "the negative electrode 420 is exposed" means a state where, when the electrode assembly 400 in a wound state is developed and the negative electrode 420 is viewed as a single body, the negative electrode 420 is observed from the outside (a state where the negative electrode 420 appears on a surface of the developed electrode assembly 400). "The negative electrode 420 is not exposed" means a state where the negative electrode 420 is not exposed in one of either the thickness direction of the negative electrode 420 or the direction orthogonal to the thickness direction of the negative electrode 420. That is, "the negative electrode 420 is not exposed" means a state where, even when the electrode assembly 400 in a wound state is developed and the negative electrode 420 is viewed as a single body, the negative electrode 420 does not appear on a surface of the negative electrode 420 and is not observed from the outside.

FIG. 6 is a cross-sectional perspective view showing the configuration of the layer-non-exposed portion 420b according to the first embodiment of the present invention. To be more specific, FIG. 6 is a cross-sectional perspective view of the negative electrode 420 taken along a line B-B' in FIG. 4.

As shown in the drawings, in this embodiment, the layer-non-exposed portion 420b is a covered portion where the negative active material layers 422 and 423 are covered by a covering material 425 mounted on the negative electrode base material layer 421. That is, the layer-non-exposed portion 420b has the covering material 425 which extends in the X axis direction along a winding end portion of the negative electrode 420 in the winding direction. As described above, the negative active material layers 422 and 423 are disposed in a state where portions of the negative active material layers 422 and 423 other than portions which are covered by the covering material 425 are exposed. Accordingly, it can be said that the negative active material layers 422 and 423 are formed on the negative electrode base material layer 421 in a state where the negative active material layers 422 and 423 are partially exposed.

The covering material 425 is a member which is mounted on the negative electrode base material layer 421 and covers the negative active material layers 422 and 423. For example, the covering material 425 is a tape which partially covers the negative active material layers 422 and 423 while being adhered to the negative electrode base material layer 421. In this embodiment, the covering material 425 is disposed on both surfaces (surfaces on both sides in the Z axis direction) of the end portion of the negative electrode 420 in the longitudinal direction and an end surface (a surface on the plus side in the Y axis direction) of the end portion so as to cover the end portion. To be more specific, the covering material 425 is a tape having an elongated strip shape which extends in the X axis direction, and the covering material 425 is mounted on an end surface (a surface on the plus side in the Y axis direction) of the negative electrode base material layer 421.

In this embodiment, "the covering material 425 is mounted on the negative electrode base material layer 421" means that the covering material 425 is connected to the negative electrode base material layer 421 in a non-separable manner, and specifically means that the covering material 425 is adhered or joined to the negative electrode base material layer 421. That is, the covering material 425 is partially brought into contact with the negative electrode base material layer 421.

As the covering material 425, it is possible to use a tape formed using a resin such as polypropylene (PP), polyethylene (PE), polyphenylene sulfide (PPS), polyphenylene ether (PPE), polyimide (PI) or polyethylene terephthalate (PET). A material for forming the covering material 425 is not limited to the above. The covering material 425 may be formed using any material provided that the material has insolubility to an electrolyte solution, and does not react with the negative electrode 420.

As described above, the peripheral edge portion of the negative electrode 420 has the layer-non-exposed portion 420b disposed on the second side (the short side in this embodiment) which differs from the first side (the long side in this embodiment) where the negative electrode 420 is connected to the negative electrode current collector 130. With such a configuration, the energy storage device 10 according to this embodiment can reduce the occurrence of contamination.

The reason why the occurrence of contamination can be reduced is described after describing the cause of the occurrence of contamination in the following description of steps for manufacturing an electrode assembly 400. In the description made hereinafter, a method for manufacturing a negative electrode plate 420 and a method for manufacturing an energy storage device 10 are described. That is, the method for manufacturing the negative electrode plate 420 includes a negative electrode plate forming step where negative active material layers 422, 423 are formed on a negative electrode base material layer 421 in a state where the negative active material layers 422, 423 are exposed partially or wholly. In the negative electrode plate forming step, the negative electrode plate 420 having a layer-non-formed portion 420a and a layer-non-exposed portion 420b on a peripheral edge portion thereof is formed. The layer-non-formed portion 420a is disposed on a first side where the negative electrode plate 420 is connected to a negative electrode current collector 130 of the energy storage device 10, and the negative active material layers 422, 423 are not formed in the layer-non-formed portion 420a. The layer-non-exposed portion 420b is disposed on a second side which differs from the first side, and the negative active material layers 422, 423 are not exposed in the layer-non-exposed portion 420b. The method for manufacturing the energy storage device 10 includes: the negative electrode plate forming step which is included in the method for manufacturing the negative electrode plate 420; and an electrode assembly forming step where the electrode assembly 400 is formed by stacking the negative electrode plate 420 formed in the negative electrode plate forming step and a positive electrode plate 410 on each other.

FIGS. 7A and 7B are schematic views showing the steps for manufacturing the electrode assembly 400 according to the first embodiment of the present invention. FIGS. 7A and 7B also include a partially enlarged view of a part shown in the schematic view. To be more specific, FIG. 7A is a schematic view showing a cutting step (slitting step) and a winding step of the steps for manufacturing the electrode assembly 400. FIG. 7B is a view schematically showing the cutting step for cutting the negative electrode 420 shown in FIG. 7A. FIGS. 7A and 7B show only one of two separators 430. The other separator 430 has substantially the same configuration as one separator 430 and hence, the illustration of the other separator 430 is omitted in the drawing.

As shown in the drawings, in the cutting step, a continuous body of positive electrodes 410 (hereinafter referred to as "positive electrode mother material"), a continuous body of negative electrodes 420 (hereinafter referred to as "negative electrode mother material") and a continuous body of separators 430 (hereinafter referred to as "separator mother material") are respectively cut (slit) by cutters 21 to 23 with predetermined lengths. To be more specific, in the cutting step, the positive electrode mother material, the negative electrode mother material and the separator mother material each of which is formed with a predetermined length (predetermined width) in the winding axis direction (X axis direction) are respectively cut with predetermined lengths in the winding direction (Y axis direction) thus forming the positive electrode 410, the negative electrode 420 and the separator 430 having the predetermined lengths in the winding direction.

Thereafter, in the winding step, the positive electrode 410, the negative electrode 420 and the separator 430 formed with the predetermined lengths in the cutting step are wound and, then, a covering material 425 is mounted on a winding end portion of the negative electrode 420 thus forming the electrode assembly 400. The covering material 425 may be mounted on the negative electrode 420 by adhering the covering material 425 to the negative electrode 420 after the positive electrode 410, the negative electrode 420 and the separator 430 are wound.

In the cutting step, the cutter 21 cuts active material layers of the positive electrode 410 and a base material layer together, and the cutter 22 cuts active material layers of the negative electrode 420 and a base material layer together. That is, the cutters 21 and 22 cut the positive electrode mother material and the negative electrode mother material where active material layers are uniformly applied to portions of the mother materials except for a layer-non-formed portion 410a and a layer-non-formed portion 420a.

For example, as shown in FIG. 7B, the cutter 22 cuts the negative electrode base material layer 421 where the negative active material layers 422 and 423 are formed on both surfaces of the negative electrode base material layer 421 together with the negative active material layers 422 and 423 thus forming the negative electrode 420 having a predetermined length in the winding direction.

As described above, in cutting the active material layer and the base material layer together, there may be a case where the following defect occurs at an end portion of the positive electrode 410 in the winding direction and an end portion of the negative electrode 420 in the winding direction both of which are portions cut by the cutters 21 and 22 respectively.

That is, at the end portion (hereinafter referred to as "cut end portion"), due to a stress or the like applied to the cut end portion at the time of cutting, there may be a case where an active material layer floats off from a base material layer or peel strength between the active material layer and the base material layer is lowered. In this case, after an electrode assembly 400 is accommodated in a container 100, there is a possibility that the active material layer at the cut end portion falls and penetrates the separator 430 so that a defect such as internal short-circuiting occurs.

Further, the base material layer is cut together with the active material layers by the cutters 21, 22 and hence, there may be a case where metal sag, metal burr or the like of the base material layer is generated at the cut end portion. In this case, after an electrode assembly 400 is accommodated in a container 100, metal sag, metal burr or the like falls and becomes micro metal residue referred to as chips and hence, there is a possibility that a defect such as internal short-circuiting occurs.

In general, a relatively hard material in the form of shellac is used as an active material of the active material layer, and the active material layer is formed with a thickness larger than a thickness of the base material layer. Accordingly, wear and chipping are liable to occur in the cutter 21, 22 which cuts the base material layer and the active material layer together. In a base material layer cut by the cutters 21 and 22 in which wear and chipping occur, metal sag, metal burr or the like easily occurs and hence, contamination is liable to occur.

Contamination which occurs due to chips causes a particularly serious problem when the chips are chips generated from the negative electrode base material layer 421 of the negative electrode 420.

To be more specific, as described above, the negative electrode base material layer 421 is made of copper, a copper alloy or the like, for example. A material for forming the negative electrode base material layer 421 is determined depending on requirements that the negative electrode base material layer 421 is required to possess (for example, a requirement that a material does not form an alloy with lithium metal, and has high electrical conductivity or the like).

Copper is melt at an electric potential of the positive electrode 410 (4V vs. $Li/Li^+$, for example). Accordingly, copper chips are generated on the negative electrode 420, and the chips are melt and ionized before the chips reach the positive electrode 410. Thereafter, when the ions reach the negative electrode 420, copper is precipitated in a dendrite shape (tree-like shape) on the negative electrode 420 and penetrates the separator 430 and hence, there is a possibility that a defect such as internal short-circuiting occurs.

Such an occurrence of contamination due to the precipitation in a dendrite shape on the negative electrode 420 is not limited to the case where copper or a copper alloy is used for forming the negative electrode base material layer 421. Contamination may occur even when any metal is used for forming the negative electrode base material layer 421 provided that the metal melts at an electric potential of the positive electrode 410.

In both the positive electrode 410 and the negative electrode 420, the higher hardness of the active material contained in the active material layer becomes, the more easily the cutter 21, 22 is worn by cutting the active material layer. That is, sharpness of the cutter 21, 22 is liable to be lowered. When the base material layer is cut by such a cutter 21, 22 where sharpness is lowered, metal sag, metal burr or the like is more liable to be generated at the cut end portion of the base material layer.

Particularly, in the negative electrode 420, there may be a case where amorphous carbon (hardly graphitizable carbon) having high hardness such as hard carbon or coke is used as a negative active material contained in the negative active material layer 422, 423. In this case, sharpness of the cutter 22 is remarkably lowered and hence, metal sag, metal burr or the like is particularly generated at the cut end portion of the negative electrode base material layer 421. Accordingly, in this case, contamination caused particularly due to the negative electrode 420 is liable to occur.

In the electrode assembly 400 where the positive electrode 410 and the negative electrode 420 are stacked on each other, the electrode assembly 400 is compressed by an inner wall of the container 100 of the energy storage device 10 and hence, portions of the positive electrode 410 and the negative electrode 420 which opposedly face each other are compressed. Accordingly, in the opposedly facing portions, the generation of chips of the base material layer and floating off of the active material layer can be suppressed by compression and hence, it is possible to reduce the cause of contamination. However, the negative electrode 420 is larger than the positive electrode 410 in size and hence, the peripheral edge portion of the negative electrode 420 is minimally compressed so that it is difficult to reduce the cause of contamination.

Accordingly, to reduce the occurrence of contamination in the energy storage device 10, it is particularly effective to reduce the occurrence of contamination caused by the negative electrode 420.

In view of the above, according to the energy storage device 10 of this embodiment, the layer-non-exposed portion 420b where the negative active material layers 422 and 423 are not exposed is disposed on the peripheral edge portion of the negative electrode 420 and hence, falling of an active material on the peripheral edge portion of the negative electrode 420 can be suppressed whereby the occurrence of contamination can be reduced. To be more specific, when the negative electrode base material layer 421 and the negative active material layers 422 and 423 are cut together in the step of manufacturing the negative electrodes 420, there is a possibility that chips of the negative electrode base material layer 421 are generated or the negative active material layer 422, 423 floats off at a cut portion. The generated chips and floating off of the layer become the causes of the above-mentioned contamination. Accordingly, when the negative active material layers 422 and 423 are disposed on the peripheral edge portion of the negative electrode 420, that is, when the negative electrode base material layer 421 and the negative active material layers 422 and 423 are cut together in the manufacturing step, the above-mentioned cause of contamination can be reduced by covering an active material on the peripheral edge portion of the negative electrode 420. Further, when the negative active material layers 422 and 423 are not disposed on the peripheral edge portion of the negative electrode 420, that is, when only the negative electrode base material layer 421 is cut in the manufacturing step, the cause of contamination which occurs at the time of cutting can be reduced. As described above, in this embodiment, the layer-non-exposed portion 420b where the negative active material layers 422 and 423 are not exposed is disposed on the peripheral edge portion of the negative electrode 420 and hence, the occurrence of contamination can be reduced.

The layer-non-exposed portion 420b is a portion (covered portion) where the negative active material layers 422 and 423 are covered by the covering material 425 mounted on the negative electrode base material layer 421.

When the negative active material layers 422 and 423 are covered by a covering material which is not mounted on the negative electrode base material layer 421, there is a possibility that the covering material falls together with the negative active material layers 422 and 423. That is, there is a possibility that contamination occurs due to falling of the negative active material layers 422 and 423 together with the covering material. Accordingly, in this embodiment, by mounting the covering material 425 on the negative electrode base material layer 421, falling of the covering material 425 can be suppressed and hence, falling of the negative active material layers 422 and 423 can be suppressed with more certainty whereby the occurrence of contamination can be reduced with more certainty.

Further, the layer-non-exposed portion 420b is disposed on the short side of the negative electrode 420 and hence, the occurrence of contamination can be reduced even when the negative electrodes 420 are manufactured by cutting the negative electrode mother material on which the negative active material layers 422 and 423 are uniformly formed along a longitudinal direction.

To be more specific, assume a case where the negative electrodes 420 are formed using a negative electrode mother material which is the negative electrode base material layer 421 on which the negative active material layers 422 and 423 are uniformly formed along the predetermined direction, and are formed in a stripe shape in the direction orthogonal to the predetermined direction (a negative electrode mother material to which stripe coating is applied). In such a case, the negative electrode mother material is cut along the predetermined direction and, thereafter, the cut negative electrode mother material is cut by the cutter 22 with a predetermined length in the predetermined direction thus forming the respective negative electrodes 420. That is, in FIGS. 7A and 7B, the negative electrode mother material which is fed to the electrode assembly 400 at a predetermined speed is cut by the cutter 22 at predetermined time intervals thus forming respective negative electrodes 420. Accordingly, the negative electrode mother material is cut without moving the cutter 22 and hence, a time necessary for manufacturing the negative electrodes 420 can be shortened.

In this case, the cutter 22 cuts the negative electrode base material layer 421 and the negative active material layers 422 and 423 together. However, after the cutting step is finished, for example, the layer-non-exposed portion 420b is disposed on the peripheral edge portion of the negative electrode 420 in a state where the end portion of the negative electrode 420 is covered so that the generation of chips of the negative electrode base material layer 421 and the floating off of the negative active material layer 422, 423 can be suppressed by such covering of the end portion of the negative electrode 420. Accordingly, even when the negative electrode mother material to which stripe coating is applied is used, the above-mentioned occurrence of contamination can be reduced.

When a generation amount of chips of the negative electrode base material layer 421 and a falling amount of the negative active material layers 422 and 423 per unit length are equal between the short side and the long side of the positive electrode 410 and the short side and the long side of the negative electrode 420, contamination is liable to occur due to an electrode having a larger circumferential length which is a combination of lengths of both short sides and lengths of both long sides. Accordingly, by disposing the layer-non-exposed portion 420b on the peripheral edge portion of the negative electrode 420 having a larger circumferential length than the positive electrode 410, the cause of contamination can be reduced at the electrode where the cause of contamination is liable to occur.

In the case where the negative electrode base material layer 421 contains metal which melts at an electric potential of the positive electrode 410, when chips of the negative electrode base material layer 421 are generated, the chips are melted on the positive electrode 410, are ionized and, thereafter, are precipitated in a dendrite shape on the negative electrode 420 so that there is a concern that internal short-circuiting occurs. Accordingly, by disposing the layer-non-exposed portion 420b on the peripheral edge portion of the negative electrode 420, it is possible to suppress the generation of chips of the negative electrode base material layer 421 and hence, it is possible to suppress the generation of internal short-circuiting caused by the precipitation of chips in a dendrite shape on the negative electrode 420.

First Modification of First Embodiment

Next, a first modification of the first embodiment of the present invention is described. In the above-mentioned first embodiment, the layer-non-exposed portion 420b is a portion where the negative active material layers 422 and 423 are covered by the covering material 425. On the other hand, in this modification, a layer-non-exposed portion is formed of a portion where negative active material layers 422 and 423 are not formed.

Figure 8:
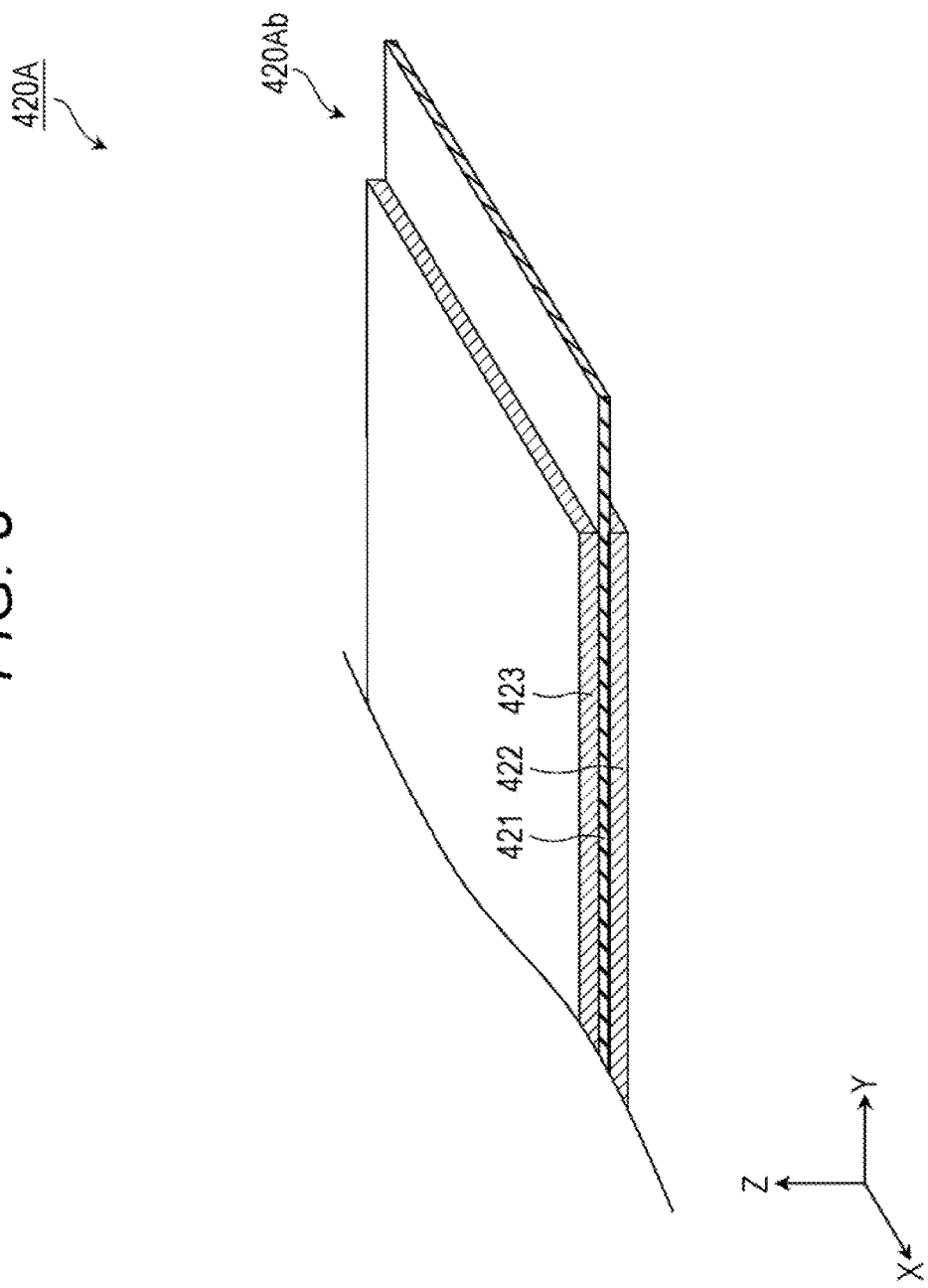
FIG. 8 is a cross-sectional perspective view showing the configuration of a layer-non-exposed portion according to a first modification

FIG. 8 is a cross-sectional perspective view showing the configuration of a layer-non-exposed portion 420Ab according to the first modification of the first embodiment of the present invention. To be more specific, FIG. 8 is a cross-sectional perspective view of a negative electrode 420A according to this modification taken along a line which corresponds to a line B-B' in FIG. 4.

As shown in the drawing, in this modification, a portion where the negative active material layers 422 and 423 are not formed is disposed on a peripheral edge portion of the negative electrode 420A as the layer-non-exposed portion 420Ab where the negative active material layers 422 and 423 are not exposed. In the layer-non-exposed portion 420Ab, not only the negative active material layers 422 and 423 are not be formed on the negative electrode base material layer 421 but also other members may not be formed on the negative electrode base material layer 421. That is, in the layer-non-exposed portion 420Ab, the negative electrode base material layer 421 may be exposed in the thickness direction of the negative electrode 420.

To be more specific, the layer-non-exposed portion 420Ab is a portion where the negative active material layers 422 and 423 are not formed along a winding end portion of the negative electrode 420A in the winding direction so that the negative electrode base material layer 421 is exposed in the Z axis direction. That is, the negative active material layers 422 and 423 are formed on the negative electrode base material layer 421 in a state where the negative active material layers 422 and 423 are wholly exposed.

According to the energy storage device of this modification having such a configuration, it is possible to acquire substantially the same advantageous effect as the above-mentioned first embodiment. That is, as described in the first embodiment, when the negative electrode base material layer 421 and the negative active material layers 422 and 423 are cut together in the step of manufacturing the negative electrodes 420A, there is a possibility that chips of the negative electrode base material layer 421 are generated or the negative active material layer 422, 423 floats off at the cut portion. The generated chips and floating off of the layer may become the causes of the above-mentioned contamination. In view of the above, in this modification, the layer-non-exposed portion 420Ab where the negative active material layers 422 and 423 are not disposed is disposed on the peripheral edge portion of the negative electrode 420A so that negative electrodes 420A can be manufactured by cutting a portion where the negative active material layers 422 and 423 are not formed. Accordingly, the above-mentioned occurrence of contamination can be reduced.

To be more specific, the negative electrodes 420 according to this modification having such a configuration are manufactured by cutting a negative electrode mother material on which the negative active material layers 422 and 423 are intermittently formed in the longitudinal direction at portions where the negative active material layers 422 and 423 are not formed (a negative electrode mother material to which intermittent coating is applied).

In the case where an electrode assembly is formed by winding a negative electrode mother material to which negative active material layers 422 and 423 are intermittently applied by coating and a positive electrode mother material to which positive active material layers 412 and 413 are intermittently applied by coating, when mother materials are wound for forming the electrode assembly of a large volume, there is a possibility that the following defect occurs. To be more specific, due to the influence caused by irregularities in accuracy in applying an active material layer by coating, irregularities in accuracy in winding and irregularities in thickness of electrodes, there is a possibility that an active-material-layer-non-formed portion at an end portion of the negative electrode 420A in the winding direction is displaced from an active-material-layer-non-formed portion at an end portion of a positive electrode in the winding direction.

Accordingly, in steps of manufacturing winding-type electrode assemblies, it is preferable that respective negative electrodes be manufactured by cutting a negative electrode mother material on which the negative active material layers 422 and 423 are uniformly formed in the longitudinal direction. That is, in the winding-type electrode assembly, it is preferable that the end portion of the negative electrode in the winding direction be formed of a portion where the negative active material layers 422 and 423 are covered by a covering material. With such a configuration, in the winding-type electrode assembly, it is possible to reduce a defect caused by a positional displacement between the positive electrode 410 and the negative electrode 420 in the winding direction.

Second Modification of First Embodiment

Next, a second modification of the first embodiment of the present invention is described. In the above-mentioned first embodiment, the layer-non-exposed portion 420*b* is disposed on the winding end portion of the negative electrode 420 in the winding direction. On the other hand, in this modification, a layer-non-exposed portion is disposed on a winding start end portion of a negative electrode in the winding direction. Further, in the above-mentioned first embodiment, the layer-non-exposed portion 420*b* is formed of the covered portion which is a portion where the negative active material layers 422 and 423 are covered by the covering material 425. On the other hand, in this modification, the layer-non-exposed portion is formed of a portion where negative active material layers 422 and 423 are covered by a winding core and a projecting portion of the winding core.

Figure 9A:
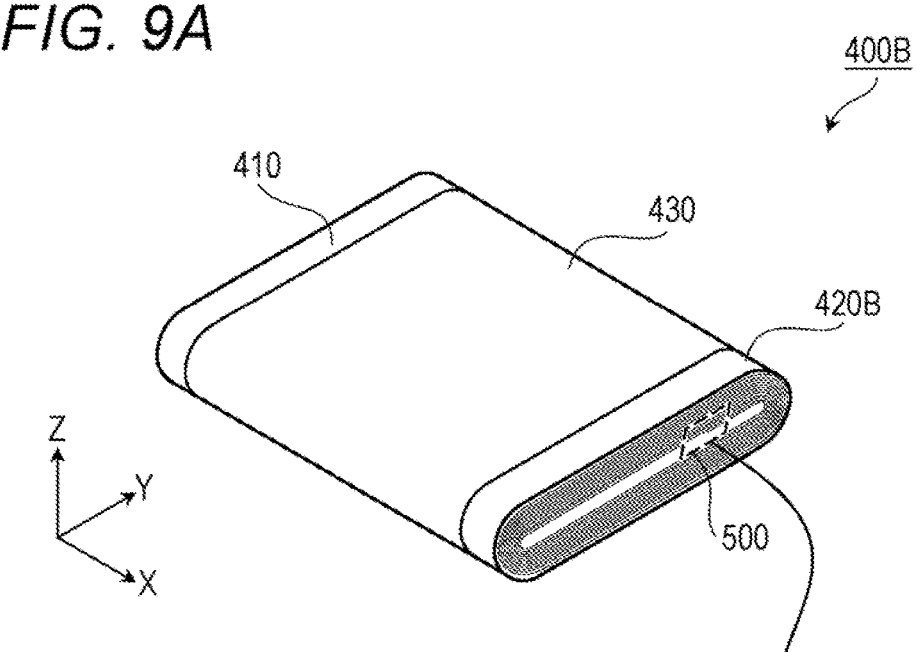
FIGS. 9A and 9B are perspective views showing the configuration of an electrode assembly according to a second modification and a partially enlarged view of the electrode assembly.
Figure 9B:
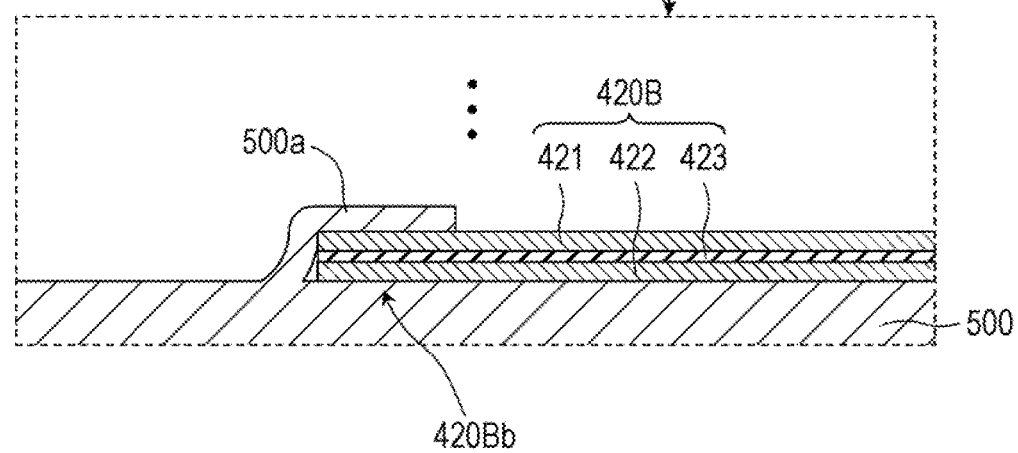

FIGS. 9A and 9B are perspective views showing the configuration of an electrode assembly 400B according to the second modification of the first embodiment of the present invention. FIGS. 9A and 9B also include a partially enlarged view of a part shown in the perspective view. To be more specific, FIG. 9A is a perspective view of the electrode assembly 400B, and FIG. 9B is an enlarged view showing a part of the electrode assembly 400B in FIG. 9A in an enlarged manner.

The electrode assembly 400B shown in the drawing is formed such that separators 430, a negative electrode 420B and a positive electrode 410 are wound around a winding core 500.

In this modification, a layer-non-exposed portion 420Bb is formed at a winding start end portion of the negative electrode 420B in the winding direction. The layer-non-exposed portion 420Bb is covered by the winding core 500 and a projecting portion 500*a* which projects outward from the winding core 500.

The projecting portion 500*a* is integrally formed with the winding core 500, and is disposed on an outer peripheral surface (a surface on the plus side in the Z axis direction) of the end portion of the negative electrode 420B in the longitudinal direction and an end surface (a surface on the minus side in the Y axis direction) of the end portion such that the projecting portion 500*a* covers and sandwiches the end portion in cooperation with the projecting portion 500*a*. That is, the projecting portion 500*a* is mounted on the end surface (the surface on the minus side in the Y axis direction) of the negative electrode base material layer 421 in a state where the projecting portion 500*a* compresses the winding start end portion of the negative electrode 420B.

According to the energy storage device of this modification having the above-mentioned configuration, substantially the same advantageous effects as the first embodiment can be acquired. That is, the winding start end portion of the negative electrode 420B is covered by the winding core 500 and the projecting portion 500*a* of the winding core 500 and hence, the generation of chips of the negative electrode base material layer 421 or floating off of the negative active material layer 422, 423 at the end portion can be suppressed. Accordingly, in the same manner as the above-mentioned first embodiment, the occurrence of contamination can be reduced.

In this modification, the layer-non-exposed portion 420Bb formed on the winding start end portion of the negative electrode 420B is formed of the covered portion where the start end portion is covered by the winding core 500 and the projecting portion 500*a*. However, in the same manner as the first embodiment, the layer-non-exposed portion 420Bb may be formed of a covered portion where the start end portion is covered by the covering material 425.

Second Embodiment

Next, a second embodiment of the present invention is described. In the above-mentioned first embodiment, the layer-non-exposed portion 420*b* is disposed on the short side of the negative electrode 420. On the other hand, in this embodiment, a layer-non-exposed portion is disposed on a long side of a negative electrode 420. In the above-mentioned first embodiment, the layer-non-exposed portion 420*b* is formed of the covered portion. On the other hand, in this embodiment, in the same manner as the above-mentioned first modification of the first embodiment, the layer-non-exposed portion is formed of a portion where negative active material layers 422 and 423 are not formed.

Figure 10:
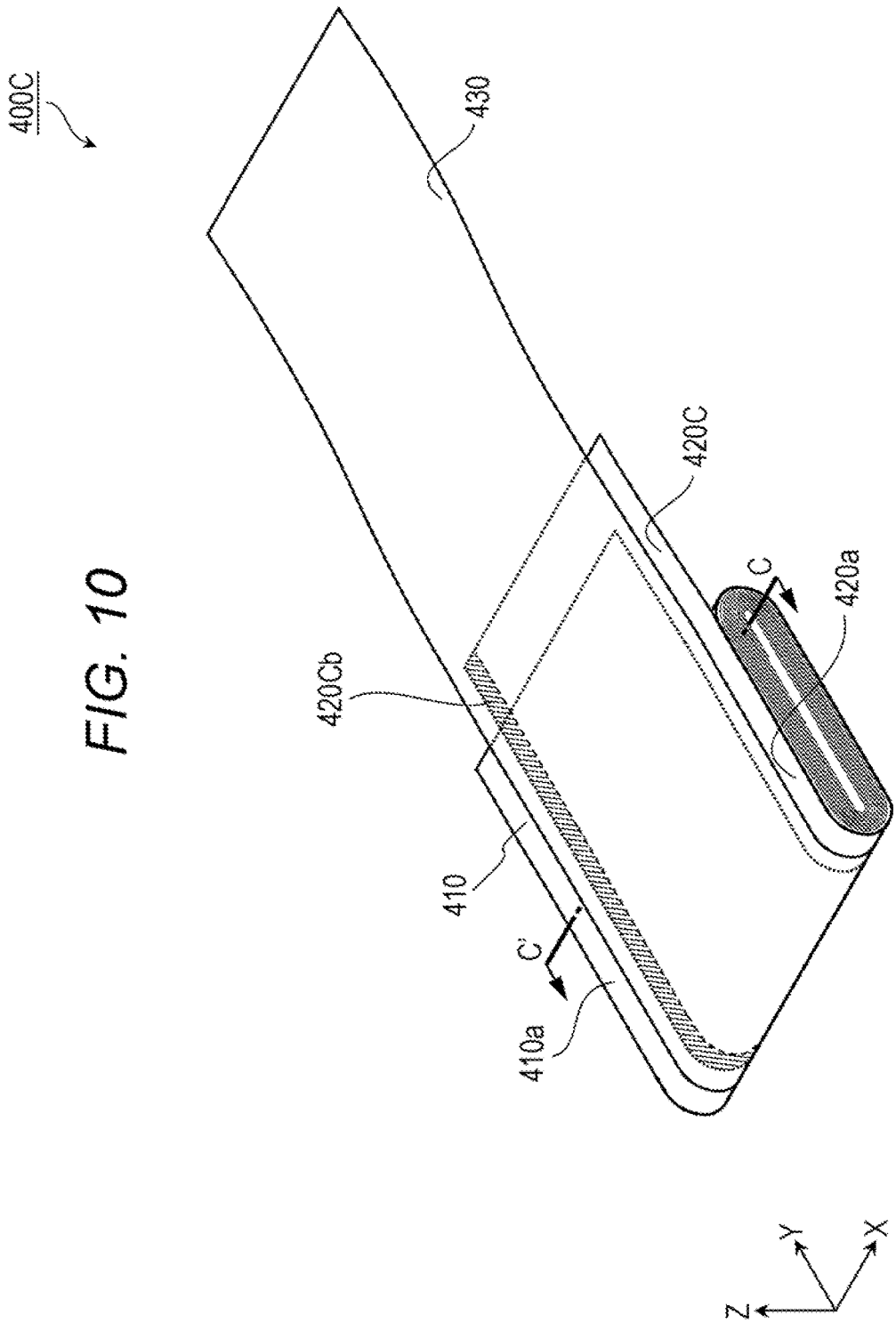
FIG. 10 is a partially developed perspective view showing an electrode assembly according to a second embodiment of the present invention in a wound state.

FIG. 10 is a partially developed perspective view showing an electrode assembly 400C according to the second embodiment of the present invention in a wound state.

Figure 11:
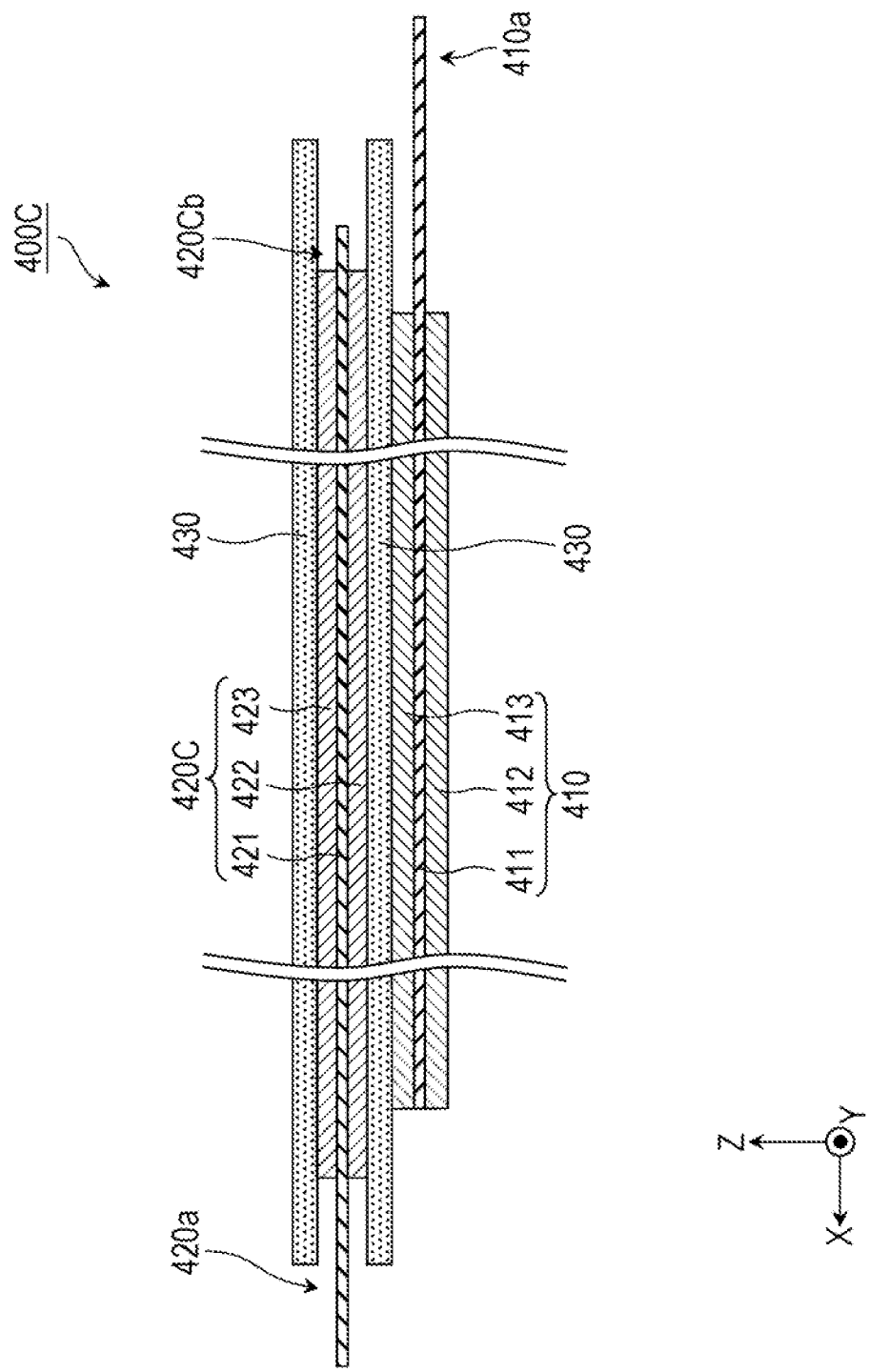
FIG. 11 is a cross-sectional view showing the configuration of the electrode assembly.

FIG. 11 is a cross-sectional view showing the configuration of the electrode assembly 400C according to the second embodiment of the present invention. To be more specific, FIG. 11 is a cross-sectional view taken along a line C-C' in FIG. 10. FIG. 11 shows only one of a plurality of sets each of which is constituted of a positive electrode 410, a negative electrode 420C and separators 430 which are repeatedly stacked by being wound. The illustration of other sets of constitutional elements is omitted in the drawing.

As shown in FIG. 10 and FIG. 11, a peripheral edge portion of the negative electrode 420C has: a layer-non-formed portion 420*a* which is disposed on a side (first side) where the negative electrode 420C is connected to a negative electrode current collector 130 and in which negative active material layers 422 and 423 are not formed; and a layer-non-exposed portion 420Cb which is disposed on a side (second side) which differs from the side where the negative electrode 420C is connected to the negative electrode current collector 130 and in which the negative active material layers 422 and 423 are not exposed.

In this embodiment, the layer-non-exposed portion 420Cb is disposed on a long side of the negative electrode 420. The layer-non-exposed portion 420Cb is formed of a portion where the negative active material layers 422 and 423 are not formed, and the layer-non-formed portion 420a and the layer-non-exposed portion 420Cb are disposed on both long sides of the negative electrode 420C. In other words, the layer-non-formed portion 420a is disposed on one of both long sides of the negative electrode 420, and the layer-non-exposed portion 420Cb is disposed on the other of both long sides of the negative electrode 420. That is, the negative electrode 420C according to this embodiment has portions where the negative active material layers 422 and 423 are not formed on both sides of the electrode assembly 400 in the winding axis direction (both sides of the electrode assembly 400 in the X axis direction).

According to the energy storage device of this embodiment having the above-mentioned configuration, substantially the same advantageous effects as the above-mentioned first embodiment can be acquired. That is, in the above-mentioned first embodiment, the reason why contamination occurs has been described by exemplifying a case where the short side of the negative electrode is cut in the cutting step. However, there may be a case where a long side of the negative electrode is cut in the manufacturing step. Accordingly, when a negative electrode base material layer 421 and the negative active material layers 422 and 423 are cut together on the long sides of the negative electrode in the step of manufacturing the negative electrode, there is a possibility that chips of the negative electrode base material layer 421 are generated or the negative active material layer 422, 423 floats off at a cut portion (an end surface of the negative electrode on the long side). The generated chips and floating off of the layer may become the causes of the above-mentioned contamination.

In view of the above, in this embodiment, the layer-non-exposed portion 420Cb where the negative active material layers 422 and 423 are not disposed is disposed on the long side of the negative electrode 420C so that the negative electrode 420C can be manufactured by cutting a portion where the negative active material layers 422 and 423 are not formed. Accordingly, the above-mentioned occurrence of contamination can be reduced.

When a generation amount of chips of the negative electrode base material layer 421 and a falling amount of the negative active material layers 422 and 423 are equal between the short side of the negative electrode 420C and the long side of the negative electrode 420C, generated chips and falling of the chips on the long side are liable to become the cause of contamination. Accordingly, by disposing the layer-non-exposed portion 420Cb on the long side of the negative electrode 420C, the cause of contamination can be reduced at the portion where the cause of contamination is liable to occur.

When the layer-non-exposed portion 420Cb disposed on the long side of the negative electrode 420C is formed of a portion where the negative active material layers 422 and 423 are covered by the covering material, for example, thicknesses of both long sides of the negative electrode 420C may differ from each other. Accordingly, in a winding-type electrode assembly, there is a possibility that the negative electrode 420C meanders at the time of winding the positive electrode and the negative electrode so that accuracy in winding is lowered thus deteriorating a yield. Further, although it is not limited to a winding-type electrode assembly, when thicknesses of both long sides of the negative electrode 420C differ from each other, a size control of the electrode assembly becomes difficult and hence, the accommodation of the electrode assembly in the inside of a container 100 of an energy storage device 10 becomes difficult. In view of the above, in this embodiment, the layer-non-exposed portion 420Cb where the negative active material layers 422 and 423 are not formed is disposed on the long side of the negative electrode 420C so that a size control of the electrode assembly 400C becomes easy, and the occurrence of contamination can be reduced while maintaining a yield.

In the electrode assembly 400C where the positive electrode 410 and the negative electrode 420C are stacked on each other, the electrode assembly 400C is compressed by an inner wall of the container 100 and hence, portions of the positive electrode 410 and the negative electrode 420C which oppositely face each other are compressed. Accordingly, in the oppositely facing portions, the generation of chips of the negative electrode base material layer 421 and floating off of the negative active material layers 422 and 423 can be suppressed by compression. In such a configuration, a length (a size in the X axis direction) of the short side of the negative electrode 420C is larger than the length of the short side of the positive electrode 410 and hence, both end portions (both end portions in the X axis direction) of the negative electrode 420C in the lateral direction do not oppositely face the positive electrode 410 whereby both end portions are minimally compressed. Accordingly, the generating of chips of the negative electrode base material layer 421 and floating off of the negative active material layers 422 and 423 are liable to occur at both end portions of the negative electrode 420C in the lateral direction thus giving rise to a possibility that contamination occurs. Accordingly, by disposing the layer-non-exposed portion 420Cb on the long side of the negative electrode 420C, it is possible to reduce the cause of contamination at a portion where the cause of contamination is liable to occur.

Other Embodiments

Although the energy storage devices according to the embodiments of the present invention and the modifications of the embodiments have been described heretofore, the present invention is not limited to the above-mentioned embodiments and the modifications of the embodiments.

That is, it should be construed that the embodiments and the modifications of the embodiments disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, the configuration of the second modification of the first embodiment may be combined with the configuration of the first embodiment. That is, a layer-non-exposed portion formed of a portion where the negative active material layers 422 and 423 are covered by the covering material mounted on the negative electrode base material layer 421 may be disposed on both short sides of the negative electrode. With such a configuration, even when negative electrodes are manufactured by cutting a negative electrode mother material on which the negative active material layers 422 and 423 are formed in a stripe shape, the occurrence of contamination can be further reduced. That is, there may be a case where so-called intermittent coating where the negative active material layers 422 and 423 are intermittently formed on the negative electrode mother material in the longitudinal direction of the negative electrode mother material is difficult from a viewpoint of manufacture. As a result, it is difficult to form portions where the negative active material layers 422 and 423 are not formed on short sides of the negative electrode. Accordingly, by configuring the layer-non-exposed portion disposed on both short sides of the negative electrode such that the negative electrode base material layer 421 is covered by the covering material, the cause of contamination can be reduced on both short sides of the negative electrode. For example, the covering material 425 in the first embodiment may be used as the covering material for one short side of the negative electrode, and the winding core 500 and the projecting portion 500a in the second modification of the first embodiment may be used as the covering material for the other short side of the negative electrode.

With respect to the layer-non-exposed portions 420b disposed on both short sides of the negative electrode, one layer-non-exposed portion 420b may be formed of a portion where the negative electrode base material layer is covered by the covering material 425 (covered portion), and the other layer-non-exposed portion 420b may be formed of a portion where the negative active material layers 422 and 423 are not formed (layer-non-formed portion). Also with such a configuration, the occurrence of contamination can be reduced in the same manner as the above-mentioned description.

The configuration of the second embodiment may be combined with the configuration of the first embodiment. That is, a configuration may be adopted where the layer-non-formed portion is disposed on one of both long sides of the negative electrode 420, the layer-non-exposed portion is disposed on the other of both long sides of the negative electrode 420, and the layer-non-exposed portion is disposed on both short sides of the negative electrode 420. In this case, both long sides of the negative electrode 420 may be formed of portions where the negative active material layers 422 and 423 are not formed, and any one of the configuration of the first embodiment, the configuration of the first modification or the configuration of the second modification may be adopted for both short sides of the negative electrode 420. For example, when all of both long sides and both short sides of the negative electrode 420 are formed of portions where the negative active material layers 422 and 423 are not formed, falling of an active material can be suppressed over the whole peripheral edge portion of the negative electrode 420 without disposing the covering material 425 or the like and hence, lowering of a capacity, increase of a resistance, occurrence of internal short-circuiting or the like can be suppressed. However, also in this case, due to wear or the like caused by a slit blade (cutter), there may be a case where sag or chips is generated at an end portion of the base material layer after the base material layer is slit. Accordingly, in such a case, the removal of metal pieces or generation of internal resistance can be suppressed by covering at least one of both short sides of the negative electrode 420 by the covering material 425 (or the projecting portion 500a of the winding core 500).

In the above-mentioned description, the layer-non-exposed portion is formed of either one of the covered portion or the layer-non-formed portion. However, the configuration of the layer-non-exposed portion is not limited to the above, and a portion of the layer-non-exposed portion 420b may be formed of the covered portion, and remaining portion of the layer-non-exposed portion 420b may be formed of the layer-non-formed portion. It is sufficient for the layer-non-exposed portion to be configured such that the layer-non-exposed portion is disposed on a side different from a side where the negative electrode is connected to the negative electrode current collector 130, and the negative active material layers 422 and 423 are not exposed in the layer-non-exposed portion. The layer-non-exposed portion may be formed of a portion other than the covered portion and the layer-non-formed portion. Also with such a configuration, the occurrence of contamination can be reduced in the same manner as the above-mentioned description.

In this embodiment, the covered portion is not limited to a portion where the negative active material layers 422 and 423 are covered by the covering material 425 mounted on the negative electrode base material layer 421. The covered portion may be a portion where the negative electrode base material layer 421 is covered by a covering material mounted on the negative electrode base material layer 421.

Figure 12:
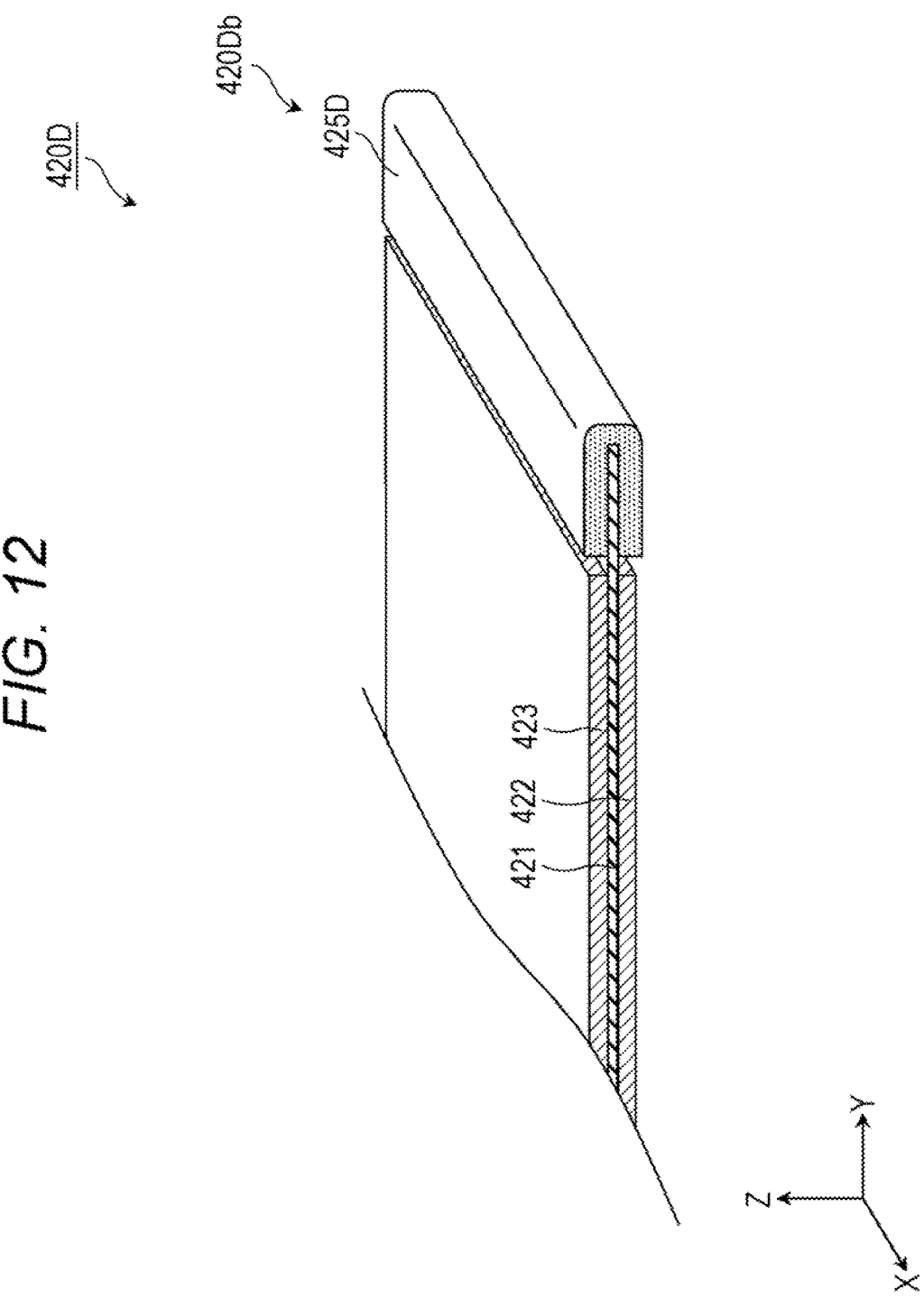
FIG. 12 is a cross-sectional perspective view showing the configuration of a layer-non-exposed portion according to another embodiment of the present invention.

FIG. 12 is a cross-sectional perspective view showing a layer-non-exposed portion 420Db having the above-mentioned configuration. To be more specific, FIG. 12 is a cross-sectional perspective view of the negative electrode 420D according to this embodiment taken along a line which corresponds to a line B-B' in FIG. 4

As shown in the drawing, unlike the layer-non-exposed portion 420b in the first embodiment, negative active material layers 422 and 423 are not formed in the layer-non-exposed portion 420Db, and the layer-non-exposed portion 420Db is formed of a covering material 425D which covers an end portion of a negative electrode 420. In the same manner as the covering material 425, the covering material 425D is disposed on both surface (both surfaces in the Z axis direction) of the end portion of the negative electrode 420 in the longitudinal direction and an end surface (a surface on the plus side in the Y axis direction) of the end portion so as to cover the end portion of the negative electrode 420. The covering material 425D is mounted on an end surface (the surface on the plus side in the Y axis direction) of a negative electrode base material layer 421. That is, the covering material 425D is mounted on the negative electrode base material layer 421, and is disposed so as to cover a portion of the negative electrode base material layer 421.

A material for forming the covering material 425D is equal to a material for forming the covering material 425 and hence, the description of the material for forming the covering material 425D is omitted.

The energy storage device which includes the negative electrode 420D having such a configuration can also acquire substantially the same advantageous effect as the above-mentioned first embodiment. To be more specific, even in the case where the negative active material layers 422 and 423 are not formed on the peripheral edge portion of the negative electrode 420, when metal sag, metal burr or the like is generated at a peripheral edge portion of the negative electrode base material layer 421, there is a possibility that metal sag, metal burr or the like falls so that contamination occurs. Accordingly, by covering the negative electrode base material layer 421 by the covering material 425D, the occurrence of contamination can be reduced.

In the above-mentioned second embodiment, the layer-non-exposed portion 420Cb is formed of the layer-non-formed portion where the negative active material layers 422 and 423 are not formed, and the layer-non-formed portion 420a and the layer-non-exposed portion 420Cb are disposed on both long sides of the negative electrode 420C. However, the layer-non-exposed portion 420Cb disposed on the long side of the negative electrode 420C may be formed of the covered portion. Also with such a configuration, although there is a possibility that accuracy in winding is lowered and yield is deteriorated to some extent, the occurrence of contamination can be reduced.

In the above-mentioned description, the length of the short side of the negative electrode is set larger than the length of the short side of the positive electrode 410. However, the length of the short side of the negative electrode may be set equal to or smaller than the length of the short side of the positive electrode 410. In this case, the end portion of the negative electrode in the lateral direction is compressed by the positive electrode 410 and hence, contamination caused by the negative electrode minimally occurs. Accordingly, although an effect is decreased to some extent, the occurrence of contamination can be reduced by disposing the layer-non-exposed portion on the peripheral edge portion of the negative electrode.

In the above-mentioned description, the circumferential length of the negative electrode which is a combination of lengths of both short sides and lengths of both long sides of the negative electrode is set larger than the circumferential length of the positive electrode 410. However, the circumferential length of the negative electrode may be set equal to or smaller than the circumferential length of the positive electrode 410. In this case, contamination caused by the negative electrode minimally occurs and hence, although an effect becomes small to some extent, the occurrence of contamination can be reduced by disposing the layer-non-exposed portion on the peripheral edge portion of the negative electrode.

In the above-mentioned description, the negative electrode base material layer 421 contains metal which melts at an electric potential of the positive electrode 410. However, the negative electrode base material layer 421 may not contain the metal. For example, the negative electrode base material layer 421 may contain metal which minimally melt at an electric potential of the positive electrode 410. In this case, although it is possible to suppress the generation of internal short-circuiting caused by the precipitation of melted chips in a dendrite shape on the negative electrode plate, there still remains a possibility that internal short-circuiting or the like is generated due to penetration of chips of the negative electrode base material layer 421 through the separator 430, for example. Accordingly, also in such a case, by disposing the layer-non-exposed portion on the peripheral edge portion of the negative electrode, generation of chips can be suppressed and hence, internal short-circuiting such as minute short-circuiting caused by chips can be suppressed.

In the above-mentioned description, the negative electrode is connected to the negative electrode current collector 130 of the energy storage device 10 on the long side thereof. However, the negative electrode may be connected to the negative electrode current collector 130 on the short side thereof. That is, it is sufficient that the layer-non-formed portion 420a and the layer-non-exposed portion be disposed on different sides (the first side and the second side) of the negative electrode. The layer-non-formed portion 420a may be disposed on one of either the short sides or the long sides of the negative electrode, and the layer-non-exposed portion may be disposed on either of the other of the short sides or the long sides of the negative electrode. It is sufficient that a side on which the layer-non-exposed portion is disposed (second side) be a side other than a side on which the layer-non-formed portion 420a is disposed (first side). A plurality of second sides may be disposed. The layer-non-exposed portion may not be disposed on all second sides, and it is sufficient that the layer-non-exposed portion be disposed on at least a portion of the second side.

In the above-mentioned description, the positive electrode and the negative electrode respectively have an elongated strip shape. However, it is sufficient that the positive electrode and the negative electrode respectively have a rectangular shape. Four sides of the rectangular shape may have the same length.

Further, the configurations which are made by arbitrarily combining the configuration of the above-mentioned embodiment and the configuration of the modification of the embodiment are also included in the scope of the present invention. The configuration of the above-mentioned embodiment and the configuration of the modification of the embodiment may be partially combined with each other as desired. For example, as described above, the configuration of the second modification of the first embodiment may be combined with the configuration of the first embodiment, or the configuration of the second embodiment may be combined with the configuration of the first embodiment.

INDUSTRIAL APPLICABILITY

The present invention provides the energy storage device which can reduce the occurrence of contamination. Accordingly, the present invention is applicable to an energy storage device or the like which is mounted on an automobile or the like which is required to possess high quality and to achieve high output power.

What is claimed is:

1. A negative electrode plate in an electrode assembly of an energy storage device, the negative electrode plate comprising:
   a base material layer;
   an active material layer formed on the base material layer in a state where the active material layer is exposed partially, a peripheral edge portion of the negative electrode plate including:
      a layer-non-formed portion that is disposed on a first side of the negative electrode plate, which is connected to a current collector of the energy storage device and on which the active material layer is not formed; and
      a layer-non-exposed portion that is disposed on a second side of the negative electrode plate, which differs from the first side and on which the active material layer is not exposed; and
   a covering material which covers a portion of the base material layer in the layer-non-exposed portion and is adhered or joined to the base material layer.

2. An energy storage device comprising:
   an electrode assembly comprising the negative electrode plate according to claim 1 and a positive electrode plate.

3. The energy storage device according to claim 2, wherein one of:
   the active material layer is formed on the base material layer in the layer-non-exposed portion and the covering material is formed on the active material layer in the layer-non-exposed portion; and
   the active material layer is not formed on the base material layer in the layer-non-exposed portion, and the covering material is formed on the base material layer in the layer-non-exposed portion.

4. The energy storage device according to claim 2, wherein the layer-non-exposed portion is disposed on a short side of the negative electrode plate.

5. The energy storage device according to claim 4, wherein the layer-non-exposed portion is formed of a portion of the base material layer, which is covered by the covering material mounted on the base material layer, and is disposed on both short sides of the negative electrode plate.

6. The energy storage device according to claim 2, wherein the layer-non-exposed portion is disposed on a long side of the negative electrode plate.

7. The energy storage device according to claim 2, wherein the negative electrode plate is larger than the positive electrode plate with respect to a circumferential length which is a combination of a length of both short sides and a length of both long sides.

8. The energy storage device according to claim 2, wherein the base material layer contains metal which melts at an electric potential of the positive electrode plate.

9. A method for manufacturing a negative electrode plate in an electrode assembly of an energy storage device, the method comprising
forming an active material layer on a base material layer in a state where the active material layer is exposed partially, a peripheral edge portion of the negative electrode plate comprising:
a layer-non-formed portion which is disposed on a first side where the negative electrode plate is connected to a current collector of the energy storage device and on which the active material layer is not formed; and
a layer-non-exposed portion which is disposed on a second side which differs from the first side and on which the active material layer is not exposed; and
covering a portion of the base material layer in the layer-non-exposed portion with a covering material which is adhered or joined to the base material layer.

10. A method for manufacturing an energy storage device comprising:
the method for manufacturing a negative electrode plate of claim 9; and
forming an electrode assembly by stacking the negative electrode plate and a positive electrode plate on each other.

11. The negative electrode plate of claim 1, wherein the covering material covers and contacts an end face of the base material layer.

12. The negative electrode plate of claim 1, wherein the layer-non-exposed portion extends along a short side of the base material layer from a long side of the base material layer to an other long side of the base material layer.

13. The negative electrode plate of claim 1, wherein the covering material wraps around a cut end portion of the peripheral edge portion so as to cover an upper surface of the cut end portion in a thickness direction and a lower surface of the cut end portion in a thickness direction.

14. An electrode assembly for an energy storage device, comprising:
a positive electrode; and
a negative electrode formed on the positive electrode and wound together with the positive electrode, and comprising:
a negative base material layer including a long side and a short side;
a negative active material layer formed on the negative base material layer, the negative active material layer being not formed on an edge portion of the long side of the negative base material layer; and
a layer-non-exposed portion that is disposed on the short side of the negative base material layer and on which the active material layer is not exposed.

15. The electrode assembly of claim 14, wherein the edge portion of the long side is formed over an entirety of a length of the negative base material layer, and an edge portion of the short side is formed over an entirety of a width of the negative base material layer.

16. The electrode assembly of claim 14, further comprising:
a covering material formed on an edge portion of the short side of the negative base material layer and adhered or joined to the negative base material layer,
wherein one of:
the negative active material layer is formed on the negative base material layer in the layer-non-exposed portion and the covering material is formed on the negative active material layer in the layer-non-exposed portion; and
the negative active material layer is not formed on the negative base material layer in the layer-non-exposed portion, and the covering material is formed on the negative base material layer in the layer-non-exposed portion.

17. The electrode assembly of claim 16, wherein the covering material covers and contacts an end face of the negative base material layer.

18. The electrode assembly of claim 14, further comprising:
a separator formed between the positive electrode and the negative electrode,
wherein the positive electrode comprises an positive base material layer including a long side and a short side, and a positive active material layer formed on the positive base material layer, the positive active material layer being not formed on an edge portion of the long side of the positive base material layer,
wherein a width of the negative active material layer is greater than a width of the positive active material layer, and
wherein in a width direction, a center of the negative active material layer is aligned with a center of the positive active material layer and a center of the separator.

19. The electrode assembly of claim 14, wherein the layer-non-exposed portion is disposed on the short side of the negative base material layer at an end of the negative base material layer in a winding direction.

20. The electrode assembly of claim 14, wherein the layer-non-exposed portion is disposed on the short side of the negative base material layer at an end of the negative base material layer opposite the winding direction.

* * * * *